United States Patent
McKibbin et al.

(10) Patent No.: US 11,216,767 B2
(45) Date of Patent: Jan. 4, 2022

(54) SYSTEM AND METHOD TO MANAGE COMPLIANCE OF REGULATED PRODUCTS

(71) Applicant: Soladoc, LLC, Indianapolis, IN (US)

(72) Inventors: Jason McKibbin, Carmel, IN (US); Jon Speer, Martinsville, IN (US)

(73) Assignee: SOLADOC, LLC, Indianapolis, IN (US)

(*) Notice: Subject to any disclaimer, the term of this patent is extended or adjusted under 35 U.S.C. 154(b) by 0 days.

(21) Appl. No.: 16/071,833

(22) PCT Filed: Jan. 23, 2017

(86) PCT No.: PCT/US2017/014590
§ 371 (c)(1),
(2) Date: Jul. 20, 2018

(87) PCT Pub. No.: WO2017/127818
PCT Pub. Date: Jul. 27, 2017

(65) Prior Publication Data
US 2019/0026675 A1    Jan. 24, 2019

Related U.S. Application Data

(60) Provisional application No. 62/281,572, filed on Jan. 21, 2016.

(51) Int. Cl.
*G06Q 10/06* (2012.01)
*G06Q 30/02* (2012.01)
*G06Q 30/06* (2012.01)

(52) U.S. Cl.
CPC . *G06Q 10/06393* (2013.01); *G06Q 10/06395* (2013.01); *G06Q 30/0201* (2013.01); *G06Q 30/0607* (2013.01)

(58) Field of Classification Search
CPC ....... G06Q 10/06393; G06Q 10/06395; G06Q 30/0201; G06Q 30/0607
USPC ........................................................ 705/7.39
See application file for complete search history.

(56) References Cited

U.S. PATENT DOCUMENTS

| | | | | |
|---|---|---|---|---|
| 8,812,342 | B2 * | 8/2014 | Barcelo ................. | G06F 21/552 705/7.28 |
| 2006/0212486 | A1 * | 9/2006 | Kennis ................... | G06F 21/55 |
| 2009/0265200 | A1 * | 10/2009 | Boswell ................ | G06Q 10/00 705/7.39 |
| 2010/0153156 | A1 * | 6/2010 | Guinta ............... | G06Q 10/0635 705/7.28 |
| 2010/0198636 | A1 * | 8/2010 | Choudhary ........... | G06F 21/552 705/7.28 |
| 2010/0262444 | A1 * | 10/2010 | Atwal .................. | G06Q 40/025 705/38 |

(Continued)

FOREIGN PATENT DOCUMENTS

GB          2459576 A  * 11/2009  ............. B25J 9/042

*Primary Examiner* — Dylan C White
(74) *Attorney, Agent, or Firm* — Ice Miller LLP

(57) ABSTRACT

This present disclosure relates to a system and method to manage compliance of regulated products. The system and method for managing compliance of regulated products includes qualitative and analysis of data obtained from within a company, across many companies, and from third party data sources to determine correlation, relevance, and importance of data points, as they relate to determining quality events, possible outcomes, risks and alerts, for the products.

23 Claims, 13 Drawing Sheets

(56) References Cited

U.S. PATENT DOCUMENTS

| | | | | |
|---|---|---|---|---|
| 2010/0324952 | A1* | 12/2010 | Bastos | G06Q 10/00 |
| | | | | 705/7.28 |
| 2011/0112973 | A1* | 5/2011 | Sanghvi | G06Q 30/018 |
| | | | | 705/317 |
| 2012/0004945 | A1* | 1/2012 | Vaswani | G06Q 10/06 |
| | | | | 705/7.28 |
| 2012/0011077 | A1* | 1/2012 | Bhagat | G06F 21/554 |
| | | | | 705/317 |
| 2012/0016802 | A1* | 1/2012 | Zeng | G06N 5/02 |
| | | | | 705/317 |
| 2013/0159049 | A1* | 6/2013 | Arumugam | G06Q 10/063 |
| | | | | 705/7.28 |
| 2015/0356183 | A1* | 12/2015 | Green | G06F 16/29 |
| | | | | 707/724 |
| 2016/0162820 | A1* | 6/2016 | Povalyayev | G06Q 10/0635 |
| | | | | 705/7.28 |
| 2016/0196516 | A1* | 7/2016 | Anisingaraju | G10L 25/63 |
| | | | | 705/7.28 |
| 2017/0132539 | A1* | 5/2017 | Ray | G06Q 10/0635 |
| 2019/0104156 | A1* | 4/2019 | Barkovic | H04L 41/22 |

* cited by examiner

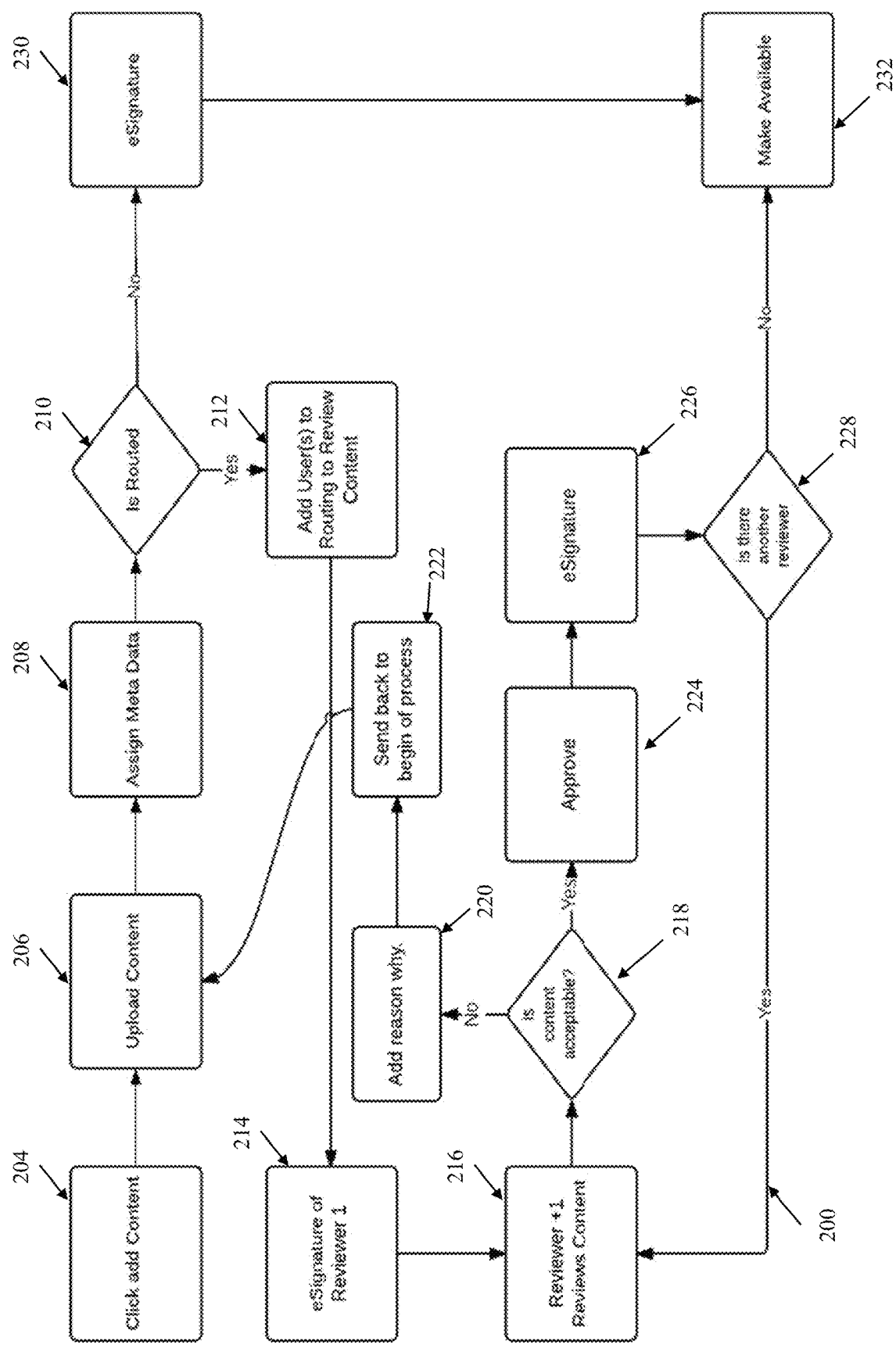

ggDSI_Visualize Global View

FIG. 8D - Object View (Task 1234)

SYSTEM AND METHOD TO MANAGE COMPLIANCE OF REGULATED PRODUCTS

CROSS REFERENCE TO RELATED APPLICATIONS

The present application is a U.S. national stage of, and claims the priority benefit of, International Patent Application Serial No. PCT/US2017/014590, filed Jan. 27, 2017 and also claims the priority benefit of U.S. Provisional Patent Application Ser. No. 62/281,572 filed Jan. 21, 2016, the contents of which are hereby incorporated in their entirety into the present disclosure.

TECHNICAL FIELD

This patent application relates to the field of regulatory compliance, and in particular, to a system and method to manage compliance of regulated products.

BACKGROUND

Medical products often require regulatory approval (e.g. from the Food and Drug Administration or FDA, CDER or Center for Drug Evaluation and Research, International Standards Organization or ISO) prior to being sold in the market. For example, in the United States, the FDA's Center for Devices and Radiological Health (CDRH) is responsible for regulating companies who manufacture, repackage, relabel, and/or import regulated products sold in the United States.

Different regulatory schemes may apply for different products. For example, under the FDA process, a 510(k) is a premarketing submission made to FDA to demonstrate that the device to be marketed is safe and effective, that is, substantially equivalent (SE), to a legally marketed device that is not subject to premarket approval (PMA). 510(k) (premarket notification) clearance by the FDA is required before marketing unless the product is exempt from 510(k) requirements. On the other hand, Premarket Approval (PMA) is the most stringent type of device marketing application required by FDA. A PMA is an application submitted to FDA to request approval to market. Unlike premarket notification, PMA approval is to be based on a determination by FDA that the PMA contains sufficient valid scientific evidence that provides reasonable assurance that the device is safe and effective for its intended use or uses. These so-called "FDA submissions" must sometimes include clinical data, demonstrative of quality assurance of the device.

To help with quality requirements, regulatory requirements and ISO/FDA submissions, many companies leverage Quality Management Systems (QMS). QM systems create the framework for a company to demonstrate its product(s) consistently meet applicable requirements and specifications while integrating product life-cycle risk management evaluating safety and effectiveness. In order to be optimally effective, QM systems must contain a network of connected data across its Quality Management processes and products that provide the company and its users relationships that help analyze, evaluate, control and monitor risk through the life cycle of a product.

It has been found that the number of serious adverse event reports is on the rise in the United States. Much of this due to quality events that occur as a result of reactive quality systems. These quality events represent failures in design, risk, materials, manufacturing process and inaccessibility of information. Some commentators estimate that more than 50% of the regulated product market still use paper based systems which are ineffective, siloed and disjointed. Additionally, existing QM systems on the market do not have data connected in a way that allows any object to be related to any other object within the QM systems.

Therefore, there is a need for an improved system and method to manage compliance of regulated products.

SUMMARY

Quality Management Systems (QMS) create the framework for a company to demonstrate its product(s) consistently meet applicable requirements and specifications while integrating product life-cycle risk management that evaluate whether products may be safe and effective. In order to be optimally effective, Quality Management Systems must contain a network of connected data across its Quality Management processes and products that provide the company and its users relationships that help analyze, evaluate, control and monitor risk through the life cycle of a product. According to one embodiment of the present disclosure, a system and method that manages content and business processes for quality and compliance across the value chain, is provided. According to one embodiment of the present disclosure, the system and method link (via bidirectional/reciprocal relationships) any object within the system to any other object (within the system or externally). This is done through the UI via ggDSILink_Anything. According to one embodiment of the present disclosure design controls and risk management objects to allow for regulatory compliance through the life-cycle of a product.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein:

FIG. 2 illustrates a flowchart of a method for managing compliance of regulated products according to at least one embodiment of the present disclosure.

FIG. 8D displays a combination flowchart of a method and components managing compliance of regulated products according to at least one embodiment of the present disclosure

DETAILED DESCRIPTION

Figure 1:
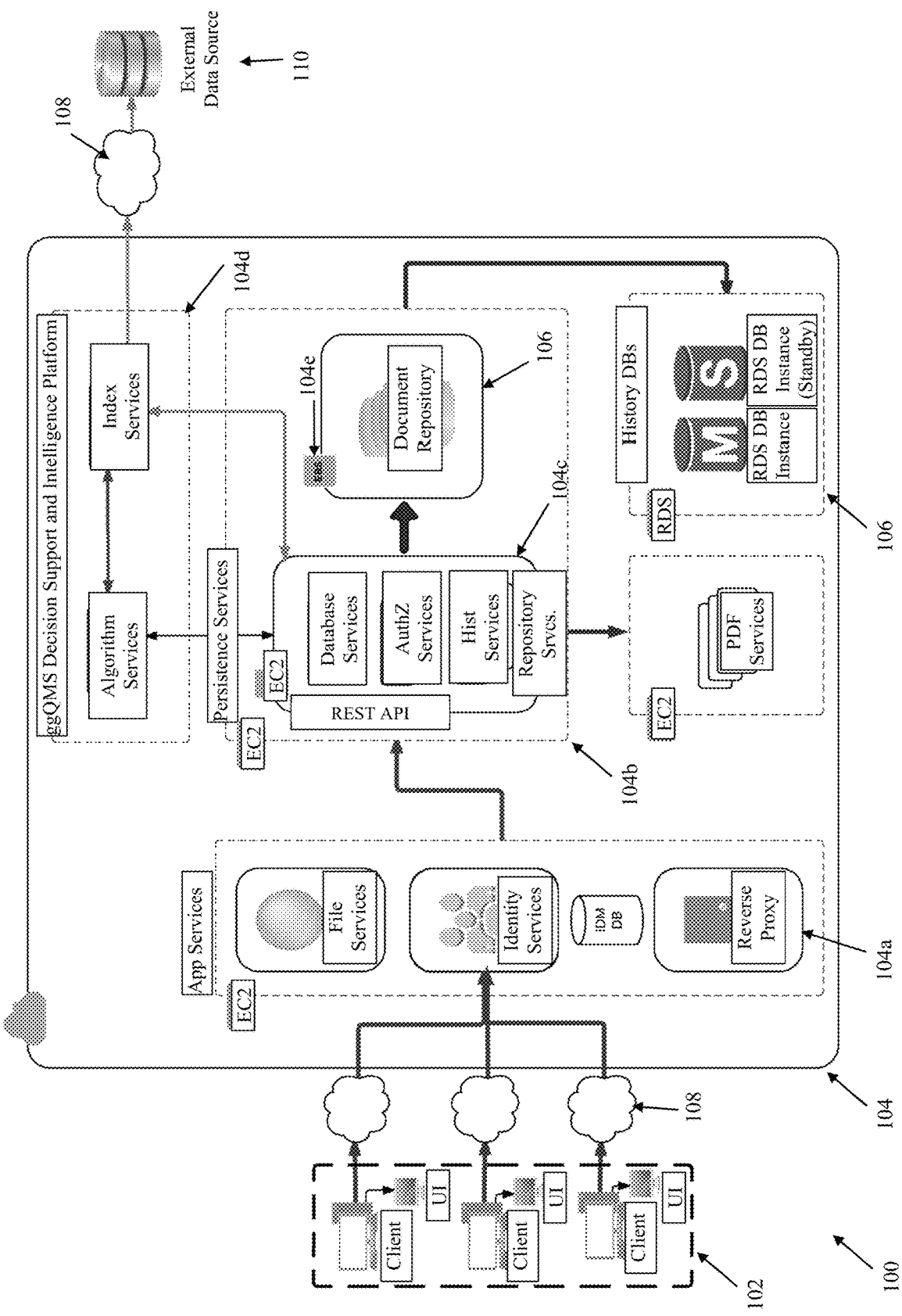
FIG. 1 illustrates a system for managing compliance of regulated products according to at least one embodiment of the present disclosure.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

This detailed description is presented in terms of programs, data structures or procedures executed on a computer or network of computers. The software programs implemented by the system may be written in any programming language—interpreted, compiled, or otherwise. These languages may include, but are not limited to, Xcode, iOS, cocoa, cocoa touch, MacRuby, PHP, ASP.net, HTML, HTML5, Ruby, Perl, Ember.js, Java, Python, C++, C#, JavaScript, and/or the Go programming language. It should be appreciated, of course, that one of skill in the art will appreciate that other languages may be used instead, or in combination with the foregoing and that web and/or mobile application frameworks may also be used, such as, for example, Ember.js, Ruby on Rails, Node.js, Zend, Symfony, Revel, Django, Struts, Spring, Play, Jo, Twitter Bootstrap and others. It should further be appreciated that the systems and methods disclosed herein may be embodied in software-as-a-service available over a computer network, such as, for example, the Internet. Further, the present disclosure may enable web services, application programming interfaces and/or service-oriented architecture through one or more application programming interfaces or otherwise.

FIG. 1 shows a system to manage compliance of regulated products, generally indicated at 100. In at least one embodiment of present disclosure, the system 100 includes a client/user 102, server 104, database 106, computer network 108, and external data source 110.

The client/user 102 may be configured to transmit information to and generally interact with a web service and/or application programming interface infrastructure housed on server 104 over computer network 108. The client/user 102 may include a web browser, mobile application, socket or tunnel, or other network connected software such that communication with the web services infrastructure (or computer infrastructure) on server 104 is possible over the computer network 108.

The client/user 102 includes one or more computers, smartphones, tablets, wearable technology, computing devices, or systems of a type well known in the art, such as a mainframe computer, workstation, personal computer, laptop computer, hand-held computer, cellular telephone, MP3 player, or personal digital assistant. The client/user 102 comprises such software, hardware, and componentry as would occur to one of skill in the art, such as, for example, one or more microprocessors, memory systems, input/output devices, device controllers, and the like. The client/user 102 also comprises one or more data entry means (not shown in FIG. 1) operable by customers of the client/user 102 for data entry, such as, for example, voice or audio control, a pointing device (such as a mouse), keyboard, touchscreen, microphone, voice recognition, and/or other data entry means known in the art. The client/user 102 also comprises a display means which may comprise various types of known displays such as liquid crystal diode displays, light emitting diode display, and the like upon which information may be displayed in a manner perceptible to the customers. It will be appreciated that client/user 102 may further comprise such software, hardware, and componentry as would occur to one of skill in the art, to operably perform the functions allocated to the client/user 102 in accordance with the present disclosure.

In at least one embodiment of the present disclosure, the system 100 includes server 104. Server 104 comprises one or more server computers, computing devices, or systems of a type known in the art. Server 104 further comprises such software, hardware, and componentry as would occur to one of skill in the art, such as, for example, microprocessors, memory systems, input/output devices, device controllers, display systems, and the like. Server 104 may comprise one of many well-known servers and/or platforms, such as, for example, IBM's AS/400 Server, RedHat Linux, IBM's AIX UNIX Server, MICROSOFT's WINDOWS NT Server, AWS Cloud services, Rackspace cloud services, any infrastructure as a service provider, or any platform as a service provider.

In FIG. 1, server 104 is shown and referred to herein as a single server. However, server 104 may comprise a plurality of servers, virtual infrastructure, or other computing devices or systems interconnected by hardware and software systems know in the art which collectively are operable to perform the functions allocated to server 104 in accordance with the present disclosure. For example, server 104 may include software systems/components such as application services 104a, persistence services 104b, repository services 104c, and a gg Decision Support and Intelligence Platform (ggDSI) 104d. In at least one embodiment of the present disclo, the database 106 further includes an EBS repository 104e.

The database 106 is configured to store information generated by the system and/or retrieved from one or more information sources. In at least one embodiment of the present disclosure, database 106 can be "associated with" server 104 where database 106 resides on server 104. Database 106 can also be "associated with" server 104 where database 106 resides on a server or computing device remote from server 104, provided that the remote server or computing device is capable of bi-directional data transfer with server 104, such as, for example, in Amazon AWS, Rackspace, or other virtual infrastructure, or any business network. In at least one embodiment of the present disclosure, the remote server or computing device upon which database 106 resides is electronically connected to server 104 such that the remote server or computing device is capable of continuous bi-directional data transfer with server 104.

For purposes of clarity, database 106 is shown in FIG. 1, and referred to herein as a single database. It will be appreciated by those of ordinary skill in the art that database 106 may comprise a plurality of databases connected by software systems of a type well known in the art, which collectively are operable to perform the functions delegated to database 106 according to the present disclosure. Database 106 may also be part of distributed data architecture, such as, for example, a Hadoop architecture, for big data services. Database 106 may comprise relational database architecture, noSQL, OLAP, or other database architecture of a type known in the database art. Database 106 may comprise one of many well-known database management systems, such as, for example, MICROSOFT's SQL Server, MICROSOFT's ACCESS, MongoDB, JCR, Redis, Hadoop, or IBM's DB2 database management systems, or the database management systems available from ORACLE or SYBASE. Database 106 retrievably stores information that is communicated to database 106 from client/user 102 or server 104.

In at least one embodiment of the present disclosure, the system 100 further includes external data source 110. External data source 110 may be operably configured to access information on third party databases such as, for example, the U.S. Food and Drug Administrations, Form 483 repository, Inspection Classification Database, FDA's Electronic Reading Room—Warning Letters, US Food and Drug Administration Recall Information Database, FDA 510k and Premarket Approval Database, FDA Oasis Report for Import Refusals, FDA Inspection Observations Database, FDA Maude Database, Soladoc created and maintained databases (such as champion list of key words/phrases, custom model and database of specific patterns), and other industry lists or databases available through third-parties. It will be appreciated that external data source 110 may be accessed via third party API and is operably configured as would occur to one of skill in the art to perform the functions allocated to external data source 110 in accordance with the present disclosure.

It should be appreciated that FIG. 1 displays one embodiment of a system 100 compatible to execute the methods described herein. The system 100 minimally requires the components described above. This minimal system may alternatively be referred to herein as the "ggQMS Decision Support and Intelligence Platform," or "ggDSI." Note that as used herein, customer(s), user(s) or company are used interchangeably to identify operators of the ggDSI platform 104d.

Figure 2A:
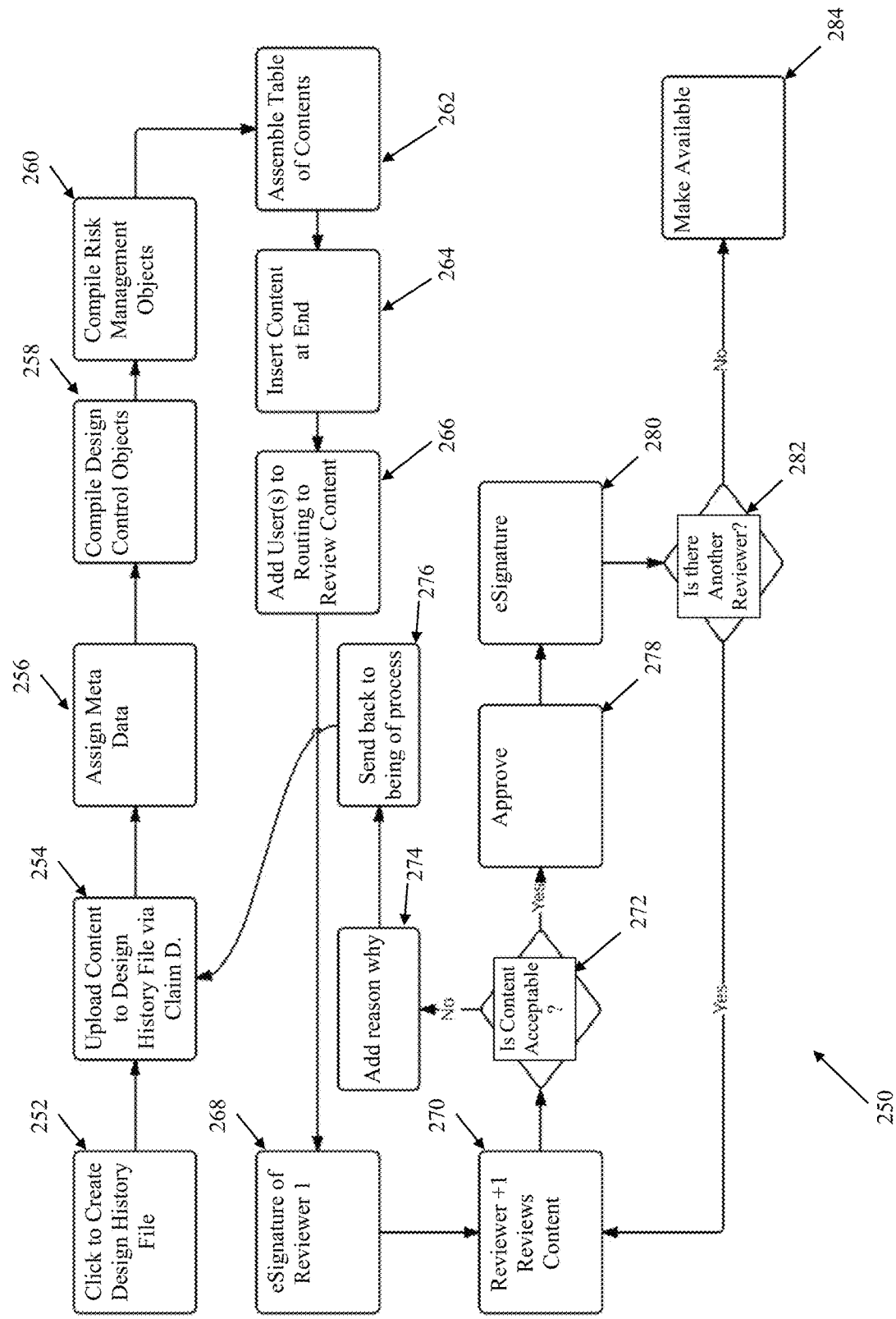
FIG. 2A illustrates a flowchart of a method for managing compliance of regulated products according to at least one embodiment of the present disclosure.

Referring now to FIG. 2, it is shown a method to manage compliance of regulated products, generally indicated at 200. In at least one embodiment of the present disclosure, the method 200 includes the steps of adding content at step 204, uploading content at step 206, assigning meta data at step 208, checking routing at step 210, adding users to review content at step 212, requesting a first reviewer signature at step 214, the first reviewer reviewing content at step 216, checking content at step 218, providing a rejection reason at step 220, sending back at step 222, approving at step 224, performing a signature at step 226, checking for a second reviewer at step 228, performing a signature at step 230, and making content available at step 232.

In at least one embodiment of the present disclosure, the method 200 includes the step of adding content at step 204. It will be appreciated that a user may operate the 102 to interact with the system 100. In at least one embodiment of the present disclosure, the method 200 includes the step of uploading content at step 206. The system 100 is operably configured to allow a user to upload content via the 102 (e.g. a dialog process). The content may include a plurality of files such as documents, spreadsheets, images, drawings, logs, diary entries, research materials, and the like, to name a few, non-limiting examples. In at least one embodiment of the present disclosure, the system 100 is operably configured to receive batch upload of data. The system 100 may be configured to receive data via File Transfer Protocol (FTP), data exchange, electronic data interchanges, or real-time integration with streaming data feeds, and the like, to name a few, non-limiting examples.

In at least one embodiment of the present disclosure, the method 200 includes the step of assigning metadata, at step 208. It will be appreciated that metadata is a set of data that describes and gives information about other data, summarizes basic information about data, and which can make finding and working with particular instances of data easier. For example, name, description, owner, classification, object type, author, date created, date modified, and file size are examples of very basic document metadata. It will be further appreciated that having the ability to filter through that metadata may facilitate easier location of specific documents or pieces of data. In at least one embodiment of the present disclosure, the system 100 is operably configured to allow a user to manually assign metadata. This may be accomplished when a user first uploads data to the system 100 at step 206. In at least one embodiment of the present disclosure, the system 100 is operably configured to automatically assign user defined object attributes (i.e. name, description, classification, category, reviewers, related/linked objects, owner, author, assignee, methods, sources/controls/mitigations, status, relationships) as metadata to the uploaded data. The system 100 assigns metadata based on synonym and content classification rules. It will be appreciated that content classification rules are run against uploaded content attributes and document text content during each upload. It will be further appreciated that uploaded content that includes text may be scanned and metadata assigned based on the contents of the text. In at least one embodiment of the present disclosure, the system 100 may be operably configured to use metadata engines, such as, for example, the Layer2® Taxonomy Manager, METAe, and SaS LIBNAME Engine.

In at least one embodiment of the present disclosure, the method 200 checks to see if the uploaded content from step 206 has a routed classification. It will be appreciated that a routed classification is appropriate for content that requires review of the uploaded content or if approvers are required to approve the content prior to making it available for use on the system 100. If the uploaded content does not have a routed classification, the method 200 proceeds to step 230. If the uploaded content does have a routed classification, the method proceeds to step 212.

In at least one embodiment of the present disclosure, the method 200 includes adding users to review content at step 212. It will be appreciated that roles and approvers for the uploaded content may be identified based on the nature of the content. The determination of what role and which individuals are assigned to that role is determined by the customer and their internal processes. In at least one embodiment of the present disclosure, the ggDSI platform 104d provides role recommendations based upon similar document categories and classifications for other documents in the customers application, as well as all customers within the ggDSI platform 104d. For example, if a document named SOP222 description sterilization validation, category sterilization, classification procedure-routed is added to the application, the author/owner of the document would be presented with a recommendation to include the roles quality, regulatory, technical, operations, where these roles are relevant to the document evaluation.

In at least one embodiment of the present disclosure, the method 200 includes requesting a first reviewer signature at step 214. It will be appreciated that the first reviewer may electronically sign; indicative that the first reviewer has reviewed the uploaded content.

In at least one embodiment of the present disclosure, the method 200 includes the first reviewer reviewing content at step 216. It will be appreciated that the reviewer is presented with the ability to verify the metadata and content for correctness and accuracy that represents the process, product and specified requirements. For example, a document would have a name, description, classification, category and the contents within the document they are approving.

In at least one embodiment of the present disclosure, the method 200 includes checking content to see if it is acceptable at step 218. If the uploaded content is acceptable, the method 200 proceeds to step 224. If the uploaded content is not acceptable, the method proceeds to step 220.

In at least one embodiment of the present disclosure, the method 200 includes the step of providing a rejection reason at step 220. For example, if the uploaded content is not acceptable, a rejection reason may be cited. The method 200 then proceeds to step 222 where the uploaded content is sent back to re-start the process of uploading content.

In at least one embodiment of the present disclosure, the method 200 includes approving at step 224. The first reviewer may have approved the uploaded content, whereby the first approver adds his/her signature at step 226.

In at least one embodiment of the present disclosure, the method 200 includes checking for a second reviewer at step 228. For example, some uploaded content may require a plurality of reviewers prior to being made available. In such embodiments, the method 200 operates to provide another reviewer an opportunity to review the uploaded content, before the uploaded content is made available for review.

In at least one embodiment of the present disclosure, the method 200 includes performing a signature at step 230, if the uploaded content is not classified for routing.

In at least one embodiment of the present disclosure, the method 200 includes making content available at step 232. It will be appreciated that the uploaded content may now be made accessible via the system 100 (e.g. via the client/user 102).

Figure 3:
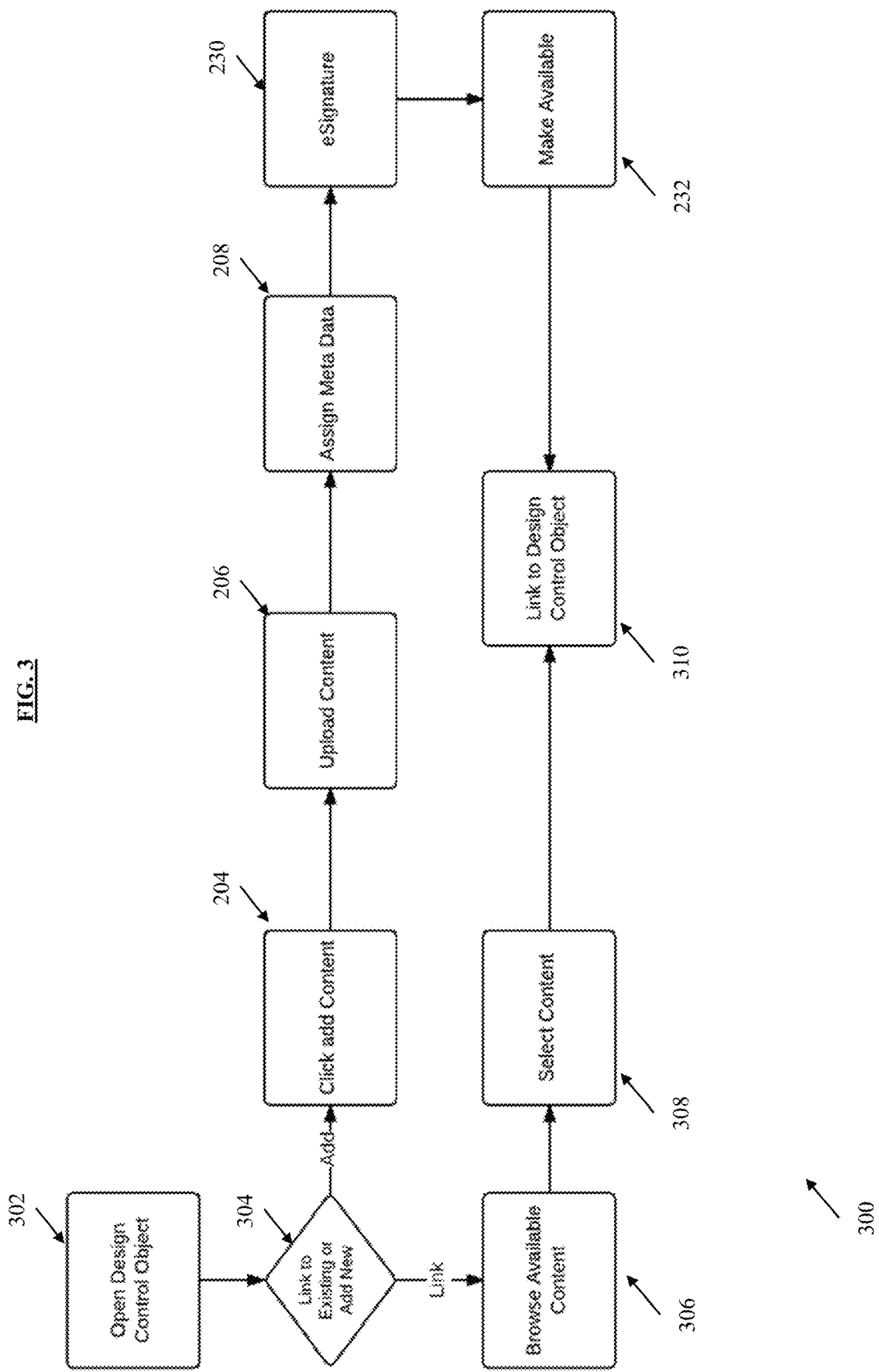
FIG. 3 illustrates a flowchart of a method for managing compliance of regulated products according to at least one embodiment of the present disclosure.

Referring now to FIG. 3, it is shown a method to manage compliance of regulated products, generally indicated at 300. In at least one embodiment of the present disclosure, the method 300 includes the step of opening a design control object at step 302, determining a link or addition to new content at step 304, adding new content at step 204, uploading content at step 206, assigning meta data at step 208, performing a signature at step 230, making content available at step 232, browsing available content at step 306, selecting content at step 308, and linking to design control object at step 310.

In at least one embodiment of the present disclosure, the method 300 includes opening a design control object at step 302. A design control object can be any featured object as further disclosed herein.

In at least one embodiment of the present disclosure, the method 300 includes determining a link or addition to new content at step 304. If content has not been added to the system 100, the method 300 is configured to allow the addition of content as disclosed in method 200. For example, the method 300 includes the steps of adding new content at step 204, uploading content at step 206, assigning metadata at step 208, performing a signature at step 230 and making content available at step 232.

In at least one embodiment of the present disclosure, the method 300 includes browsing available content at step 306. If it is determined at step 304 that uploaded content is already available for linking, the method 300 proceeds to step 306 wherein content is browsed.

In at least one embodiment of the present disclosure, the method 300 includes selecting content at step 308. Previously uploaded content that is to be linked is selected to be linked to the design control object.

In at least one embodiment of the present disclosure, the method 300 includes linking (creating a relationship, usually reciprocal, between objects within the ggDSI platform 104d) to design control object at step 310. This relationship is created by the user via a client/user (e.g. client/user 102). It will be appreciated that the interface may allow a user to efficiently relate any ggObject to any other ggObject. For example, a user can use a GUI interface to link project ID PDProj-1, Harm (HM-3) source to document SOP555. In doing so, the user creates a reciprocal relationship between project ID PDProj-1, Harm (HM-3) source and document SOP555, where both objects are analyzed when either of the objects is modified or otherwise affected. For example, the user can use the GUI interface to link a Corrective Action, Preventative Action (CAPA) investigation task to the individual ggObjects (i.e. a defined domain item; a Design Control items (User Need, Design Input, Design Output, Design Verification, Design Validation, Design Review), a Document, Risk Items (Hazard, Foreseeable Event, Hazardous Situation, Harm and their sources/controls/mitigations, Risk Review), a CAPA, a Complaint, an Audit, a Nonconformance, a task) that ggDSI suggests to investigate or create their own link to ggObjects. CAPA777 investigation task 454 is related to document SOP555 and Complain383, and Audit388 and Nonconformance999 and Project PDProj-6 Design Verification (DVer-19).

It will be appreciated that although method 300 recites the use of a design control object, it will nonetheless be noted that a risk management object may also be linked in the same manner as a design control object. For example, at step 302 where a design control object is opened, a risk management object may instead be opened and linked (or have new content added), as disclosed above. Similarly, in step 310 where the design control object is linked, the design control object may be replaced by a risk managed object instead, thereby creating a link to the design control object. It will be appreciated that, a user may have the option to view specified object types via the ggDSI platform 104d. A user can specify same object type (as the starting object), Risk (Hazard, Foreseeable Event, Hazardous Situation, Harm, Sources, Controls/Mitigations), Design Controls (User Needs, Design Inputs, Design Outputs, Design Verifications, Design Validations), Design Reviews, Documents, CAPA (Corrective Action, Preventative Action), Complaints, Audits, Nonconformances.

Figure 4:
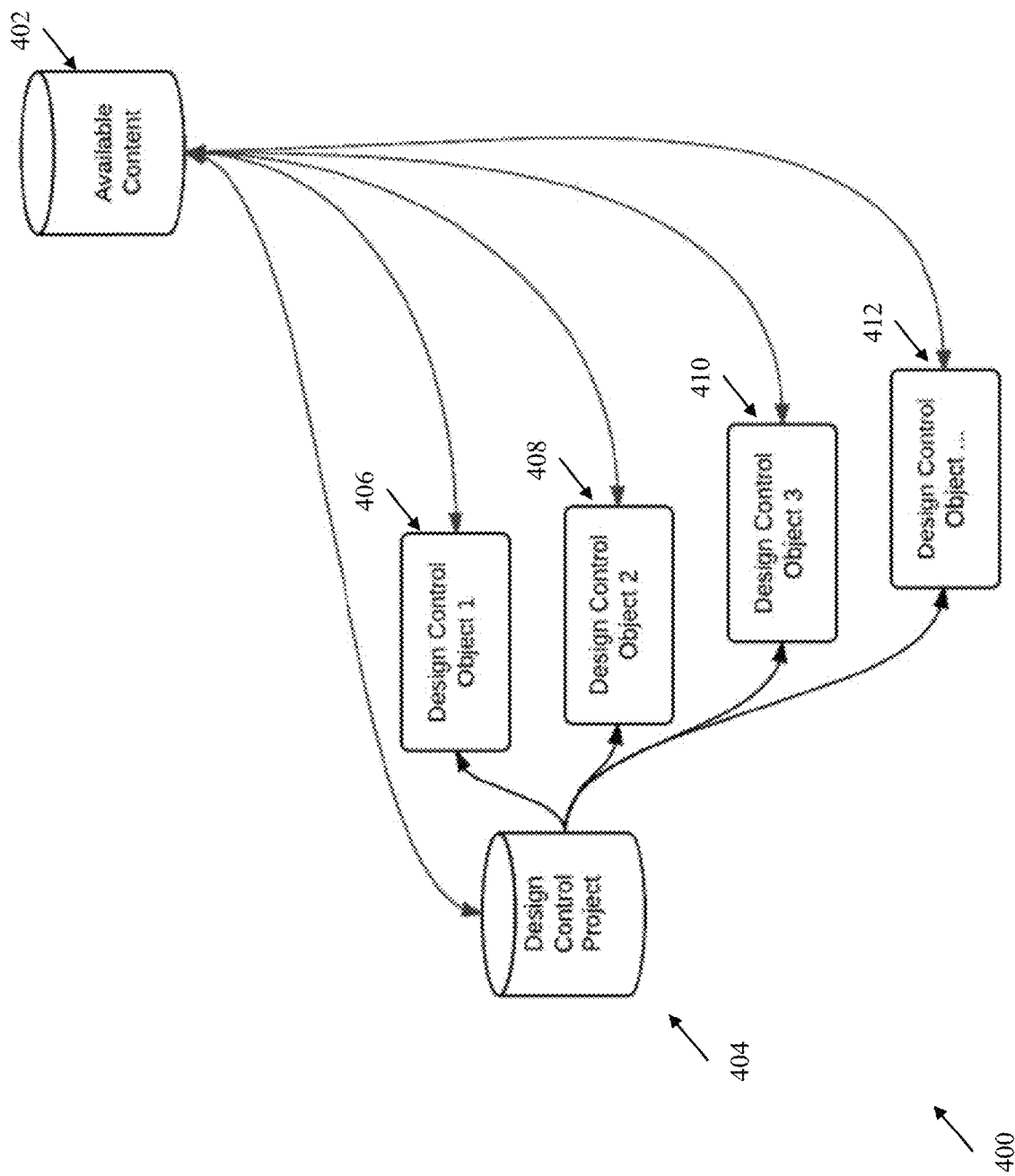
FIG. 4 illustrates a flowchart of a method for managing compliance of regulated products according to at least one embodiment of the present disclosure.

Referring now to FIG. 4, it is shown a schematic drawing of system to manage compliance of regulated products, generally indicated at 400. In at least one embodiment of the present disclosure, the system 400 includes an available content repository 402, a design control project repository 404, and a plurality of design control objects (466, 408, 410, and 412).

In at least one embodiment of the present disclosure, available content repository 402 is a database (e.g. database 106), that is communicatively coupled to the rest of the components in system 400, as shown in FIG. 4. Although only one available content repository 402 is shown, it will nonetheless be appreciated by one having ordinary skill in the art that a plurality of available content repositories may be available.

In at least one embodiment of the present disclosure, the system 400 further includes a design control project repository 404. The design control project repository 404 is configured to include the plurality of design control objects (466, 408, 410, and 412). In at least one embodiment of the present disclosure, the plurality of design control objects (466, 408, 410, and 412) include user needs, design inputs, design outputs, design verifications, design validations, design reviews, and a design history file, to name a few, non-limiting example.

Figure 5:
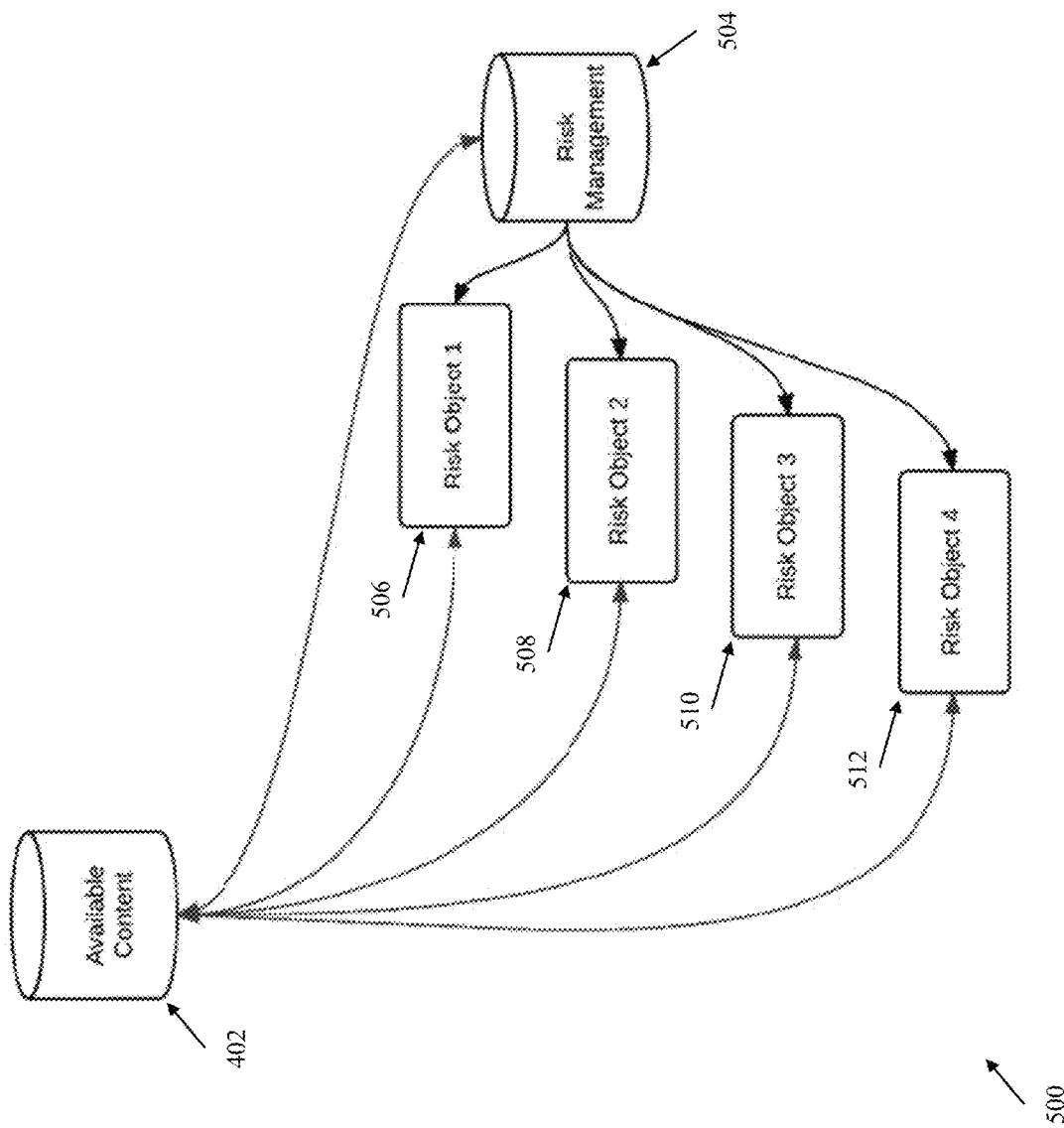
FIG. 5 illustrates a flowchart of a method for managing compliance of regulated products according to at least one embodiment of the present disclosure.

Referring now to FIG. 5, it is shown a schematic drawing of system to manage compliance of regulated products, generally indicated at 500. In at least one embodiment of the present disclosure, the system 500 includes the available content repository 402, a risk management repository 504, and a plurality of risk management objects (506, 508, 510, 512).

In at least one embodiment of the present disclosure, the risk management repository 504 is configured to include the plurality of risk management objects (506, 508, 510, 512). The plurality of risk management objects (506, 508, 510, 512) include hazard objects, foreseeable event objects, hazardous situations, harm (including source and control of harm), and a risk management file, to name a few, non-limiting examples. Although only one risk management repository 504 is shown, it will nonetheless be appreciated by one having ordinary skill in the art that a plurality of available content repositories may be available.

Figure 6:
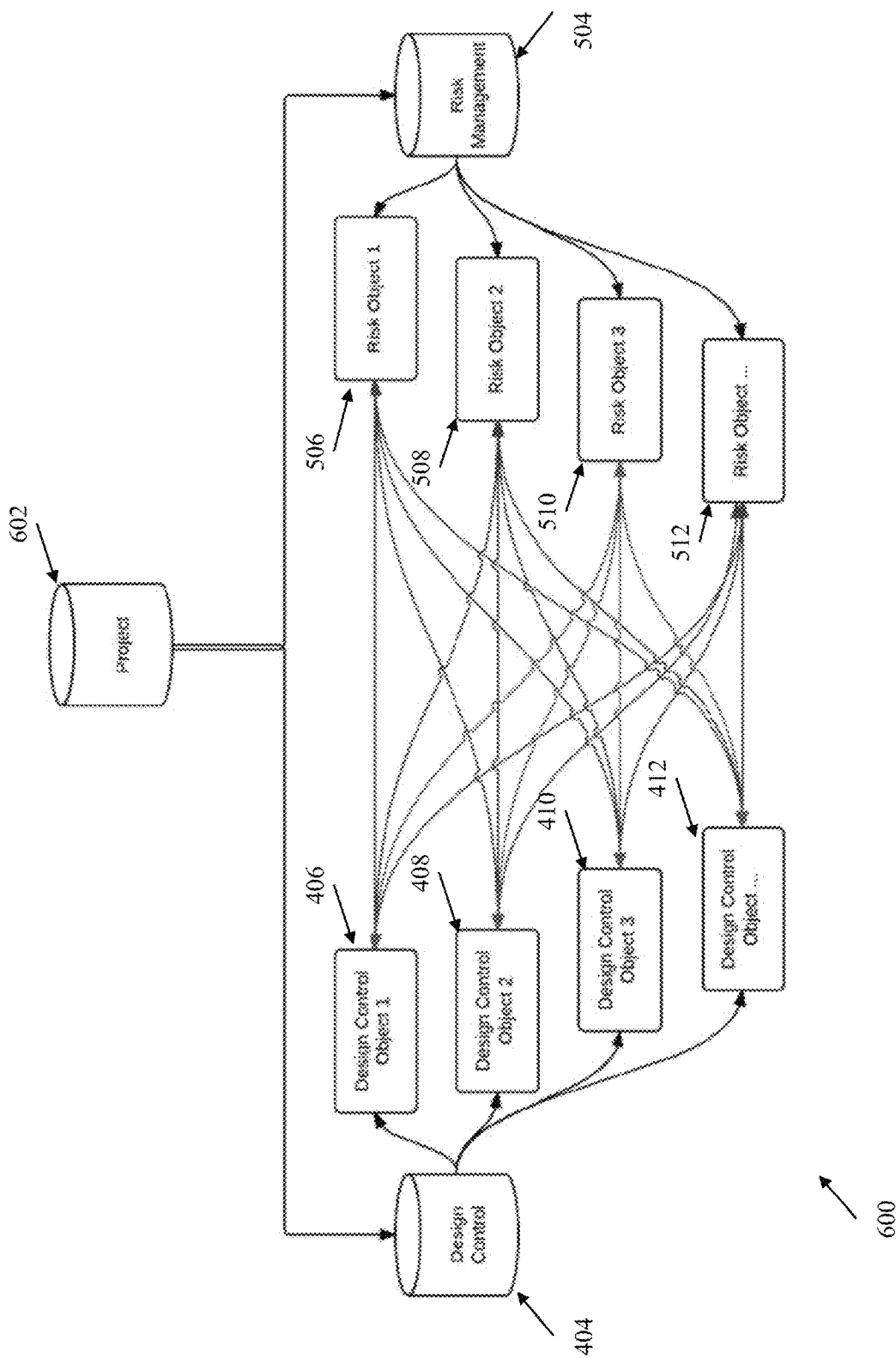
FIG. 6 illustrates a flowchart of a method for managing compliance of regulated products according to at least one embodiment of the present disclosure.

Referring now to FIG. 6, it is shown a schematic drawing of a system to manage compliance of regulated products, generally indicated at 600. In at least one embodiment of the present disclosure, the system 600 includes a project repository 602, the design control repository 404, the risk management repository 504, the plurality of design control objects (466, 408, 410, and 412), and the plurality of risk management objects (506, 508, 510, 512).

It will be appreciated that the system 600 allows for the plurality of design control objects (466, 408, 410, and 412) to be operably connected to the each of the plurality of risk management objects (506, 508, 510, 512). Although only four design control objects and four risk management objects are shown, it will nonetheless be appreciated by one having ordinary skill in the art that a plurality of design control objects and risk management objects may be available.

In at least one embodiment of the present disclosure, the system 100 is configured to compile a design history file using all of the aforementioned relationships. A design history file is a compilation of documentation that describes the design history of a finished regulated product. For example, referring to FIG. 2A, it is shown a method to manage compliance of regulated products, generally indicated at 250. The method 250 includes the steps of steps of creating a design history file at step 252, uploading content at step 254, assigning meta data at step 256, compiling design objects at step 258, compiling risk management objects at step 260, assembling a table of contents at step 262, inserting content at the end at step 264, adding users to review content at step 266, requesting a first reviewer signature at step 268, the first reviewer reviewing content at step 270, checking content at step 272, providing a rejection reason at step 274, sending back at step 276, approving at step 278, performing a signature at step 280, checking for a second reviewer at step 282, and making content the design history file available at step 284.

In at least one embodiment of the present disclosure, the method 250 includes creating a design history file at step 252. It will be appreciated that a user may operate the GUI 102 to interact with the system 100. In at least one embodiment of the present disclosure, the method 200 includes the step of uploading content at step 254. The system 100 is operably configured to allow a user to upload content via the client/user 102 (i.e. a dialog process). The content may include a plurality of files such as documents, spreadsheets, images, drawings, logs, diary entries, research materials, and the like, to name a few, non-limiting examples. In at least one embodiment of the present disclosure, the system 100 is operably configured to receive batch upload of data. The system 100 may be configured to receive data via File Transfer Protocol (FTP) batch, data exchange, electronic data interchanges, or real-time integration with streaming data feeds, and the like, to name a few, non-limiting examples.

In at least one embodiment of the present disclosure, the method 250 includes assigning metadata, at step 256. It will be appreciated that metadata, or a set of data that describes and gives information about other data, summarizes basic information about data, which can make finding and working with particular instances of data easier. For example, name, description, owner, classification, object type, author, date created and date modified and file size are examples of very basic document metadata. It will be further appreciated that having the ability to filter through that metadata makes it much easier to locate a specific document or piece of data. In at least one embodiment of the present disclosure, the system 100 is operably configured to allow a user to manually assign metadata. This may be accomplished when a user first uploads data to the system 100 at step 254. In at least one embodiment of the present disclosure, the system 100 is operably configured to automatically assign metadata to the uploaded data. The system 100 assigns metadata based on synonym and content classification rules. It will be appreciated that content classification rules are run against uploaded content attributes and document text content during each upload. It will be further appreciated that uploaded content that includes text may be scanned and metadata assigned based on the ggObject type and contents of the text. In most cases, the metadata is assigned by the user. The metadata requirements are determined by the ggObject type. For example, the ggObject type document requires the following attributes: name, description, classification, category, author, owner, and reviewer(s). The ggObject type document has additional optional attributes such as tags. In at least one embodiment of the present disclosure, the system 100 may be operably configured to use metadata engines, such as, for example, the Layer2® Taxonomy Manager, METAe, and SaS LIBNAME Engine.

In at least one embodiment of the present disclosure, the method 250 includes compiling design control objects at step 258. In step 258 project design controls (e.g. user needs, design inputs, design outputs, design verification and design validation), objects and their defined relationships to each other (known as the design control matrix), along with their linked objects such as documents, are collected and output into summary format.

In at least one embodiment of the present disclosure, the method 250 includes compiling design control objects at step 260. At step 260 a project risk (hazards, foreseeable events, hazardous situations, harms—sources & controls/mitigations, risk levels) objects and their defined relationships to each other (known as the risk matrix) along with their linked objects such as documents, are collected and output into summary format.

In at least one embodiment of the present disclosure, the method 250 includes assembling a table of contents at step 262. The data from step 258 and 260 are assembled together in summary format and assembled into an output document (artifact) where step 262 creates a table of context to reference the data contained in the output of 258 and 260.

In at least one embodiment of the present disclosure, the method 250 includes inserting content at the end, at step 264. Step 264 inserts the table of contents into the output document (artifact) to create a final document that contains a project's design controls, risks and appropriate table of context to reference information therein.

In at least one embodiment of the present disclosure, the method 250 includes adding users to review content at step 266. It will be appreciated that roles and approvers for the uploaded content may be identified based on the nature of the content.

In at least one embodiment of the present disclosure, the method 250 includes requesting a first reviewer signature at step 268. It will be appreciated that the first reviewer may electronically sign; indicative that the first reviewed has reviewed the uploaded content.

In at least one embodiment of the present disclosure, the method 250 includes the first reviewer reviewing content at step 270.

In at least one embodiment of the present disclosure, the method 250 includes checking content to see if it is acceptable, at step 272. If the uploaded content is acceptable, the method 250 proceeds to step 278. If the uploaded content is not acceptable, the method proceeds to step 274.

In at least one embodiment of the present disclosure, the method 250 includes providing a rejection reason at step 276. For example, if the uploaded content is not actable, a rejection reason may be cited. The method 200 then proceeds to step 254 where the uploaded content is sent back to re-start the process of uploading content.

In at least one embodiment of the present disclosure, the method 250 includes approving at step 278. The first reviewer may have approved the uploaded content, whereby the first approver adds his/her signature at step 280.

In at least one embodiment of the present disclosure, the method 250 includes checking for a second reviewer at step 282. For example, some uploaded content may require a plurality of reviewers prior to being made available. In such embodiments, the method 250 operates to provide another reviewer an opportunity to review the uploaded content, before the uploaded content is made available for review.

In at least one embodiment of the present disclosure, the method 250 includes and making the design history file available at step 284. It will be appreciated that the design history file may now be made accessible via the system 100 (e.g. via the client/user 102).

It will be appreciated that the method 250 allows for compiling a design history file using all of the aforementioned relationships. It will be further appreciated that the method 250 pulls together all of the design control objects, risk objects, associated content and relationship between design control objects and risk objects along with any associated content to the design history file to create a design history file.

Figure 7:
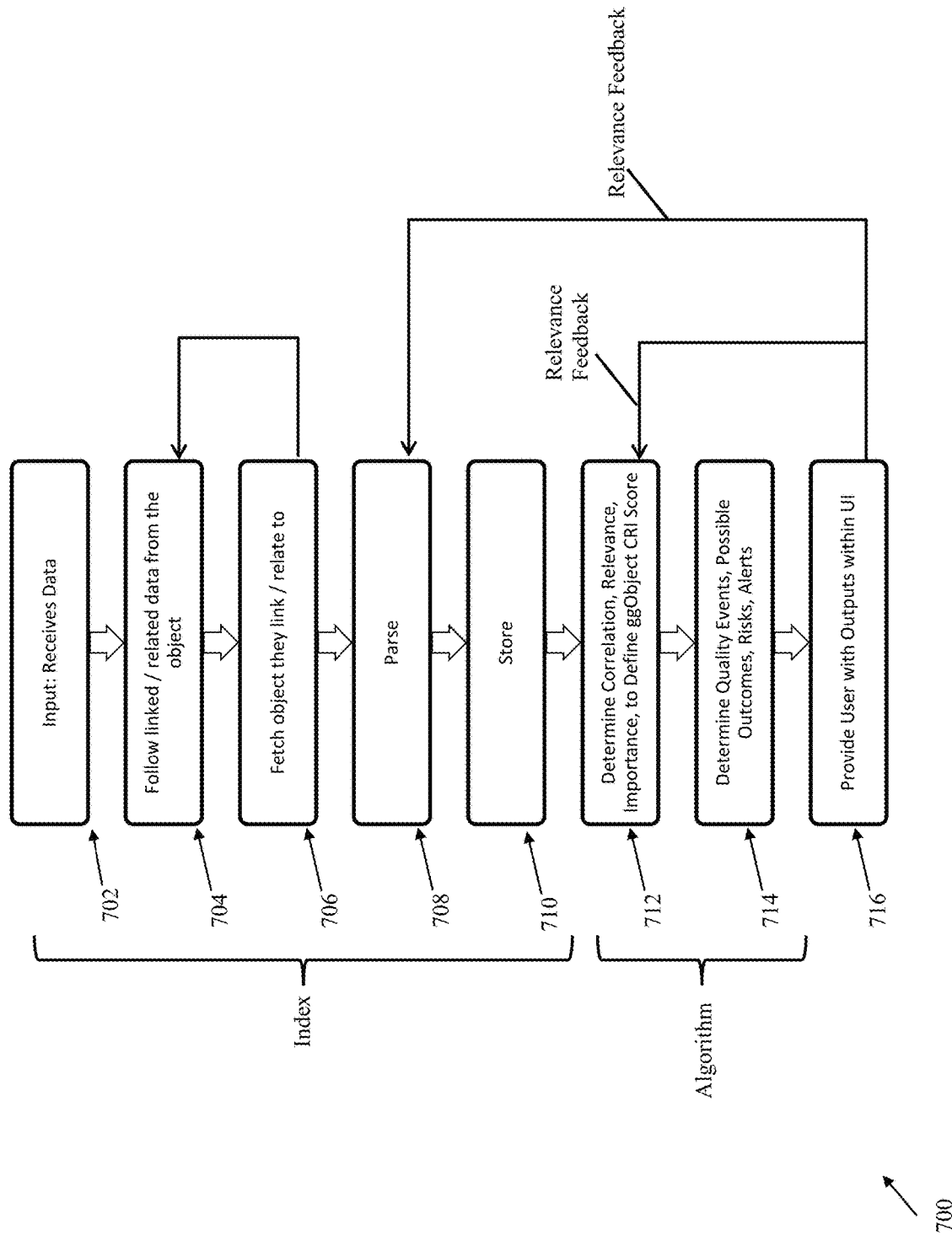
FIG. 7 illustrates a flowchart of a method for managing compliance of regulated products according to at least one embodiment of the present disclosure.

Referring now to FIG. 7, it is shown a method for managing compliance of regulated products, generally indicated at 700. In at least one embodiment of the present disclosure, the method 700 includes receiving data at step 702; following linked/related data from the object at step 704; fetching object at step 706; parsing at step 708; storing at step 710; determining correlation, relevance, importance at step 712; determining quality events, possible outcomes, risks, alerts, at step 714; and, providing Outputs at step 716.

In at least one embodiment of the present disclosure, the method 700 includes the step of receiving data at step 702. Data may be received from a plurality of sources including database 106, external data source 110, or other customer specific data, to name a few, non-limiting examples. For example, a customer of the ggDSI platform 104d may create customer specific data (e.g. as disclosed in methods 200, 300, 400, 500, and 600). It will be appreciated that such the ggDSI platform 104d may use data based on a customer's determined relationships, external data sources such as FDA 483 findings, trending, MAUDE database and adverse event reports. It will be further appreciated that the ggDSI platform 104d can use the patterns and relationships for all customers of the ggDSI platform 104d wherein the customers are engaged in a multi-tenant model, as further disclosed herein. By way of example, the ggDSI platform 104d provides indexes that search for external content via the web or specified sources (such as FDA 483 Warning letters). ggDSI platform 104d looks for adverse events that have been reported against a company. Companies are required to report adverse events to the FDA, which is public knowledge. Companies normally would have to search these manually, however, it will be appreciated that the ggDSI platform 104d would automatically 'crawl' these reports daily to identify adverse events for a customer's company and alert the customer to the event.

In at least one embodiment of the present disclosure, the method 700 includes following linked/related data from the object at step 704 at step 704. At step 704, the ggDSI platform 104d parses the data from step 702 to create indexes and establish bidirectional/reciprocal relationships between the data sets. The ggDSI platform 104d uses unique methods of applying indexes and algorithms for the use of analyzing and interpreting quality, regulatory and risk management data to help the user make better decisions. It will be appreciated that the ggDSI platform 104d includes an ecosystem whereby the customers help each other to make safe and efficacious products. It's a community of continuous improvement. Indexes contain stored data that are specific to the ggObjects including object type and their related/linked objects. These indexes only store information that is important to the index and doesn't include most of the metadata/attribute information of the objects. It will be appreciated that each object contains a plurality of metadata in the form of attributes. The index does not store this metadata unless necessarily input to the index itself thereby allowing the ggDSI algorithms to process their results much faster. It will be further appreciated that instead of having to crawl all of the data and their relationships, the data synthesized in the index. The algorithm determines how to analyze the index as an input and formulate its output. For example, a risk harm index would look at the harms for every project and their source, control/mitigation, risk level and relationships, and would not look at any other data. Similarly, the algorithm risk level high will read through the risk harm index, pull projects that have a "high" risk level and use the relationships of the harms within the projects to determine correlation by the number of shared relationships. For example, the data is parsed and indexes are created prior to any search such that the search is performed on the created indexes instead of each data element of the dataset. In at least one embodiment of the present disclosure, the ggDSI platform 104*d* contains crawlers, indexes and algorithms that are external/independent of the application allowing the platform to efficiently and effectively search any content, whether within the platform or external to it. It will be appreciated that the ggDSI platform 104*d* defines specific patterns within indexes to determine what content to be stored within that index. This ensures optimum performance when a user needs the results as they do not have to be computed adhoc when the user selects to see the results. It will be further appreciated that the ggDSI platform 104*d* (e.g. the external ggDSI information engine) provides a method where it can be easily maintained (changed, removed or added) to optimize the performance and returned results. The ggDSI platform 104*d* uses algorithms to analyze the indexes to produce the most meaningful patterns and information contained within the ggDSI indexes thereby returning the most relevant and important information to the user.

In at least one embodiment of the present disclosure, the method 700 fetches objects at step 706. In at least one embodiment of the present disclosure, the ggDSI indexes define the inputs, follow their linked/related data to other objects and fetch objects and their customer linked/related data parsing out specific information within the data from each of the objects and their relationships and store this information. Additionally, ggDSI indexes define specific phrases and patterns of data that the crawler follows to determine potential relationships that have not been specified by the customer. By way of one example, the phrase "sterilization validation" would be stored in a ggDSI defined pattern database (e.g. database 106) where the crawler would use this pattern database and parse through the different ggObjects looking for this specific term, as shown in step 708. As the crawler finds each term, the term's weight is evaluated by location of the term itself in the metadata of the individual ggObjects. By way of an example, if the phrase is found in the stored document file content it is given the highest weight followed by title which has a greater weight than the tags which has a greater weight than description which has a greater weight than notes.

In at least one embodiment of the present disclosure, the method 700 stores the specific object attributes defined and their relationships to each other, at step 710.

In at least one embodiment of the present disclosure, the method 700 includes determining correlation, relevance, importance, risk and ggObject Correlation, Relevance and Importance (CRI) score, at step 712. In at least one embodiment of the present disclosure, ggObject CRI score is derived through the combination of correlation, relevance, importance and risk to provide the outputs that have the highest probabilistic score. It will be appreciated that ggDSI algorithms need to determine what information to present to the user through its interface. The ggObject CRI score of the potential outputs is compared to other ggObject CRI scores. Of the potential outputs, the ggObject CRI score as related to other ggObject CRI scores determines whether the output is displayed in the user interface. In at least one embodiment of the present disclosure, algorithms use correlation as a way to measure how closely different objects are related. By way of example, if ggObject 1 is directly related to ggObject 2, it has the highest correlation as their relationship is tightly bound. By way of another example, if ggObject 1 is related to ggObject 3, which in turn is related to ggObject 6, and which in turn is related to ggObject 20, which is related to ggObject 2, then the correlation of ggObject 1 and ggObject 2 is low, given the intermediary objects that "tie" ggObject 1 and ggObject 2.

In at least one embodiment of the present disclosure, relevance is determined by using the ggObject type and its use by other ggObject types and how strong those relationships are to each other. For example, a project risk harm has a high relevance to a complaint that contains a product failure whereas a project user need would have a lower relevance to the same complaint. By way of another example, when adding a document to the platform, the individuals assigned to previous routings along with roles for the same type of document defined attributes would have a high relevance whereas a document with different attributes would have a low relevance. In at least one embodiment of the present disclosure, algorithms use importance to discern the weight that should be attributed to ggObject CRI score. It will be appreciated that the importance is defined by the importance of the relationships between two or more ggObjects. The more a ggObject is linked to other ggObjects, the higher its importance. Specific ggObject types such as those contained in risk management have the highest importance given the intent of the risk management platform therefore if the more closely a ggObject is related to a risk object, the higher its importance. In at least one embodiment of the present disclosure, ggObjects contained within the root cause and corrective action sections of CAPAs, complaints, audits and nonconformances have a high importance. If a ggObject type of risk and ggObject defined in a corrective action and preventative action or CAPAs are related to each other, their importance is a mathematically weighted higher than their individual importance scores to promote the significance of these relationship to each other. It will be appreciated that when the outputs of the algorithms are presented to the user, the user has the ability to accept or dismiss to indicate through a feedback loop if the output is relevant to what they are trying to accomplish. It will be further appreciated that this feedback is feedback into the customer part of the index as a way to learn and make the index data and algorithms increasingly accurate over time.

In at least one embodiment of the present disclosure, the method 700 includes the step of creating design controls and risk management objects at step 706. A customer of the ggDSI platform 104*d* may create design control objects and risk management objects as disclosed in method 300. In at least one embodiment of the present disclosure, the ggDSI platform 104*d* utilizes two critical types of relationships in order to generate analytics for a customer. The first is via customer specified relationships. In at least one embodiment of the present disclosure, the customer specified relationships are the bidirectional/reciprocal relationships that are made by the customer through client/user 102, and stored in database 106, whereby one object is linked to another object, or to a plurality of other objects. The second type of relationship utilizes specific indexes whereby the ggDSI platform 104*d* uses a phrase and pattern database (e.g. database 106) maintained by the ggDSI platform 104*d* as well as object metadata such as name, title, description, tag to look within the metadata and document file content to determine non-user specified relationships. (i.e. the ggDSI determined/learned relationship). In at least one embodiment of the present disclosure, the indexes look for data within attributes of ggObjects that may be closely related but not defined through a customer relationship. By way of an example, document SOP333 may contain the document name SOP576 within the document file content itself, but may not be referenced in the document attributes or defined customer relationships. The ggDSI platform 104*d* would define a relationship between SOP333 and SOP576. By way of another example, Task 999 summary/finding section contains a reference to project PDProj-1 Harm (HM-5) which is not defined by a customer defined relationship; here, the ggDSI platform 104*d* would define a relationship between Task999 (and its customer defined relationships) and PDProj-1 Harm (HM-5). By way of yet another example, ISO 11737 is reference in the attributes for CAPA888 investigation task, Complaint333, Project PDProj-1 Design Verification (DVal-22) and Project PDProj-25 Design Validation (DVal-22) and Risk Harm Control/Mitigation (HM-15). In addition, there is a document with the name of ISO 11737. ggDSI creates a relationship between all of these objects even though these were attributes and not customer defined relationships. It will be appreciated that the ggDSI determined relationship uses anything contained with the ggDSI platform 104*d*, including customer specified relationships as well as attributes, OCR documents and external sources, to name a few, non-limiting examples.

In at least one embodiment of the present disclosure, the method 700 includes the step of correlating at step 708. The ggDSI platform 104*d* leverages its customer specified and ggDSI determined relationships to more accurately and efficiently determine the root cause of quality problems, predict potential problems or risks, provide insight into preventative measures through the company's product and eQMS life-cycle. It will be appreciated that as complexity grows within a company and its products, the harder it is to determine a true root cause. It will be further appreciated that the ggDSI platform 104*d* may enhance a company's ability to qualitatively and more accurately determine and fix a root cause along with identifying where else in their eQMS this same failure is likely to occur.

In at least one embodiment of the present disclosure, the method 700 includes the step of determining quality event outcomes at step 714. In at least one embodiment of the present disclosure, the algorithm reads specific indexes as its input, identifies shared relationships within the indexed objects and depending on the algorithms intent, determines the correlation, relevance and importance of those relationships which determines the algorithms output. By way of an example, if a complaint from a customer for a specific product is investigated, ggDSI looks at the ggObjects being investigated and related failures or potential issues. ggDSI uses a CAPA investigation index with the CAPA risk algorithm to determine if other products or processes have similar or correlated relationships as the complaint device. If such a determination is made, the ggDSI platform 104*d* provides the user with a UI that informs them of other products or processes that have similar design controls and risks that may be susceptible to the same failure. By way of another example, the ggDSI platform 104*d* may index equipment calibration and maintenance for all customers. When a customer adds a new piece of equipment to the workspace, it can suggest the appropriate calibration frequency, methods along with suggested maintenance schedules. In addition, the ggDSI platform 104*d* is configured to detect changes in calibration and maintenance for certain types of equipment and suggest changes to similar equipment.

By way of another example, when a new development project is created and the appropriate device classification, intended use, indications for us, product code are defined, the ggDSI platform 104*d* is configured to provide critical design control and risk management elements that are shared across other similar customer products as well as all products across all customers, as further disclosed herein. It will be appreciated that this does not share any intellectual property but is devised to provide preventative advice on components that are similar across companies using the ggDSI platform 104*d*. In at least one embodiment of the present disclosure, the ggDSI platform 104*d* looks for specific metadata (such as product codes, classifications, intended use, indications for use, product type, regulation numbers) that is shared across projects for a single customer or all customers. It will be appreciated that the ggDSI platform 104*d* uses these attributes and to look for two important factors. The first is what specific metadata patterns is there a high correlation across all customers that a single customer does not have. By way of an example, the ggDSI platform 104*d* is configured to suggest that "sterilization validation" is required and that the following sterilization documents are used across all projects for similar products. It will be appreciated that ggDSI provides a user with assistance in crafting high level requirements for user needs, design inputs, design outputs, design validations, design verification along with risk elements such as risk acceptability matrix, hazards, foreseeable events, hazardous situations, harms, and potential controls/mitigation.

In at least one embodiment of the present disclosure, the second factor looks at how a single customer has defined their attributes and correlates those with other of their projects and customers. By way of an example, if a customer ("customer X") defines the risk acceptability matrix initial risk levels and controlled/mitigated residual risk but that does not correlate with other projects and other customers with the same metadata, customer X will be able to see recommended differences. Continuing with this example, if customer X states a complaint does not require a CAPA, but the pattern of the complaint investigation, root causes and actions (for a similar product) have a high correlation with other complaints for customer X and across other customers of creating a CAPA, ggDSI would provide such use information to let customer X know a CAPA should be required.

In at least one embodiment of the present disclosure, the ggDSI platform 104*d* is configured to so that a customer does not have to traverse the network of data relationships, to accurately and efficiently visualize the objects within the ggDSI platform 104*d* that correlate to the data they are trying to analyze, evaluate, control and monitor. It will be appreciated that the results of the ggDSI provide the user critical information that may be crucial to their decision making process.

By way of an example, the ggDSI platform 104*d* is configured to recognize that two design control projects with similar products (classification, intended use, indications for us, product code) have substantially different risk profiles and substantially different verification and validation activities. This creates a risk alert which provides the customer with information to identify, evaluate and correct the differences, if deemed necessary.

Figure 8:
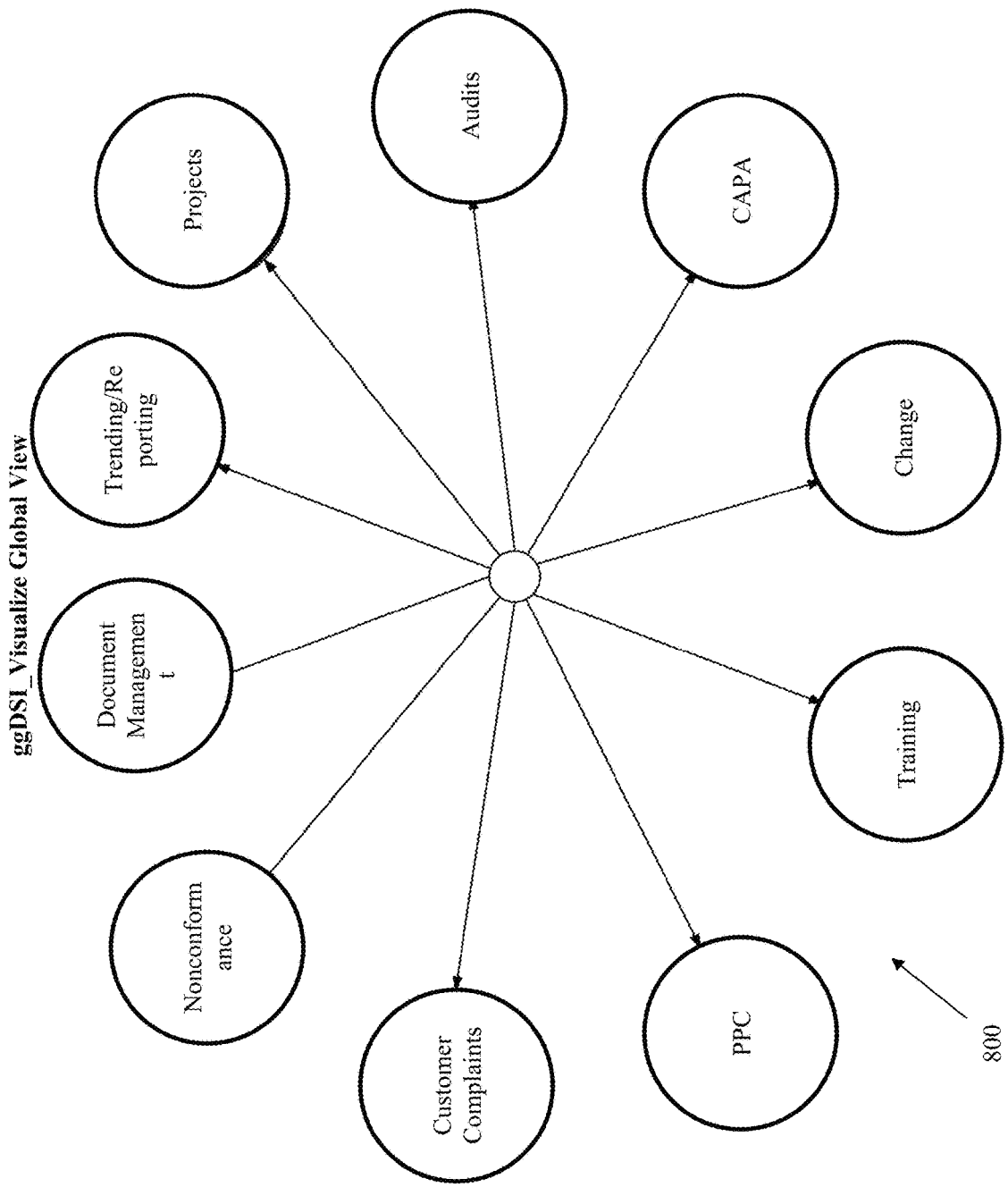
FIG. 8 displays a combination flowchart of a method and components managing compliance of regulated products according to at least one embodiment of the present disclosure.
Figure 8A:
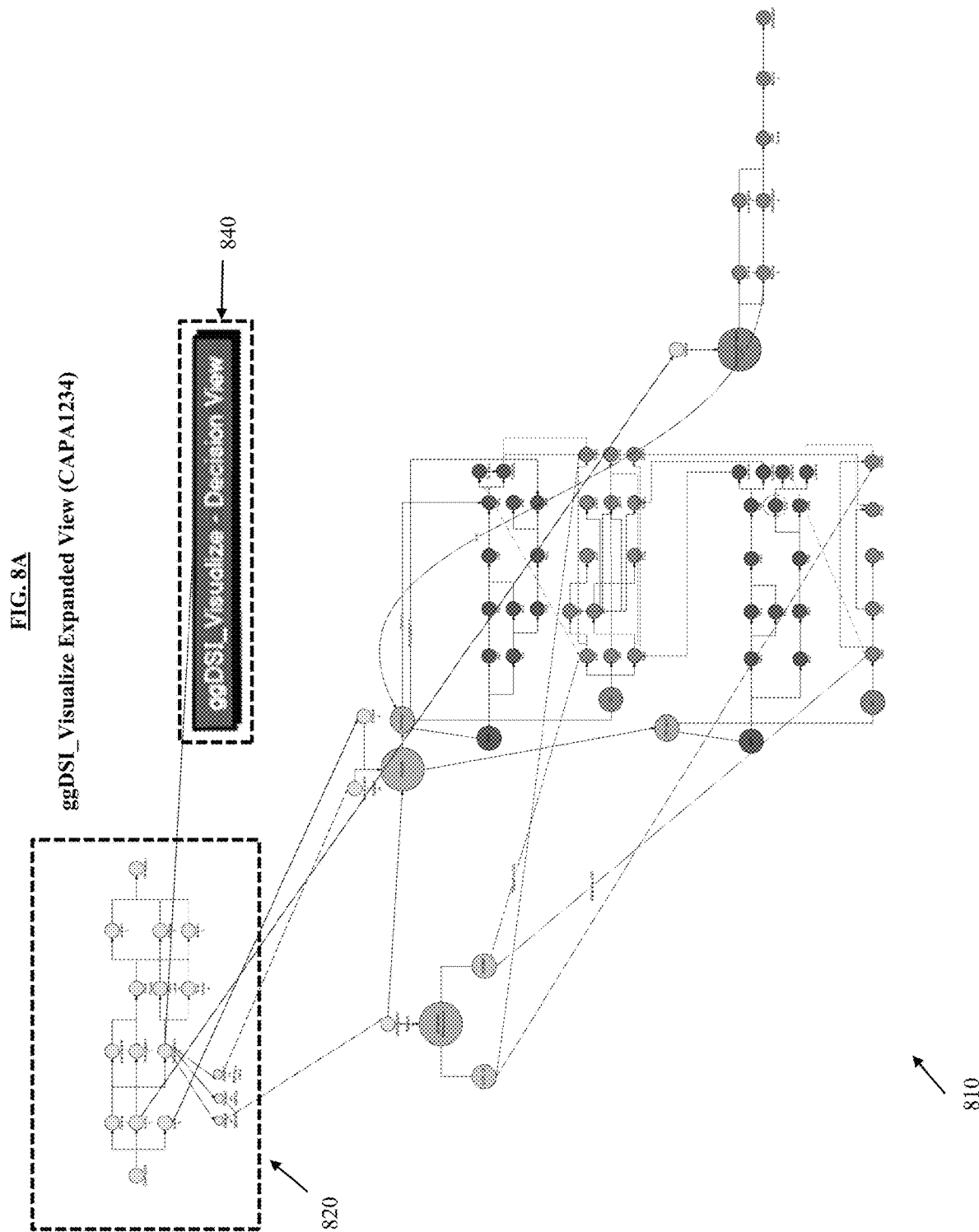
FIG. 8A displays a combination flowchart of a method and components managing compliance of regulated products according to at least one embodiment of the present disclosure.
Figure 8B:
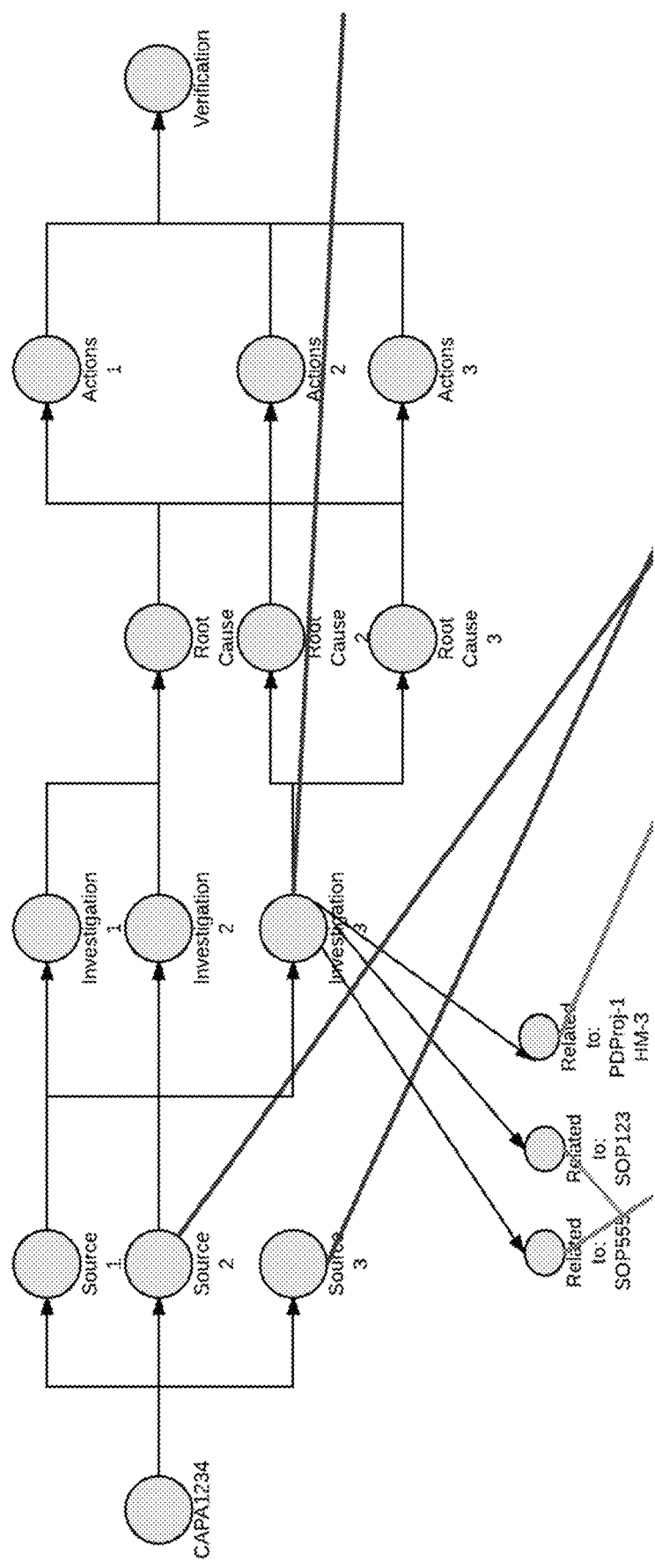
FIG. 8B displays a combination flowchart of a method and components managing compliance of regulated products according to at least one embodiment of the present disclosure.

In at least one embodiment of the present disclosure, the ggDSI platform 104*d* is configured to evaluate corrective action and preventative actions or CAPA. When evaluating a CAPA, the ggDSI platform 104*d* is configured to evaluate the specific sources being investigated and its relationships to provide similar relationships across all products that could result in similar failures or issues. For example, referring to FIG. 8A, it is shown a visual data model where CAPA 1234, has 3 sources—Source 1, Source 2, and Source 3. Source 3 however, is also tied to investigation 3 related to ggObjects (defined domain item i.e. a Design Control items (User Need, Design Input, Design Output, Design Verification, Design Validation, Design Review), a Document, Risk Items (Hazard, Foreseeable Event, Hazardous Situation, Harm and their sources/controls/mitigations, Risk Review), a Corrective Action and Preventative Action or CAPA, a Complaint, an Audit, a Nonconformance, a task), as shown in FIG. 8B, a visual data model. The ggDSI platform 104d is configured to automatically identify that the "Related to Product Development Project name, Risk Harm PDProj-1 (HM-3)" is linked to second PDProj-2 (HM-2) through the relationships of Document SOP555, as shown at 860, on FIG. 8B. It will be appreciated that the ggDSI platform 104d would provide the user with the other areas of risk, which by way of this example, is PDProj-2 (HM-2), as shown at 862 in FIG. 8B.

Figure 8C:
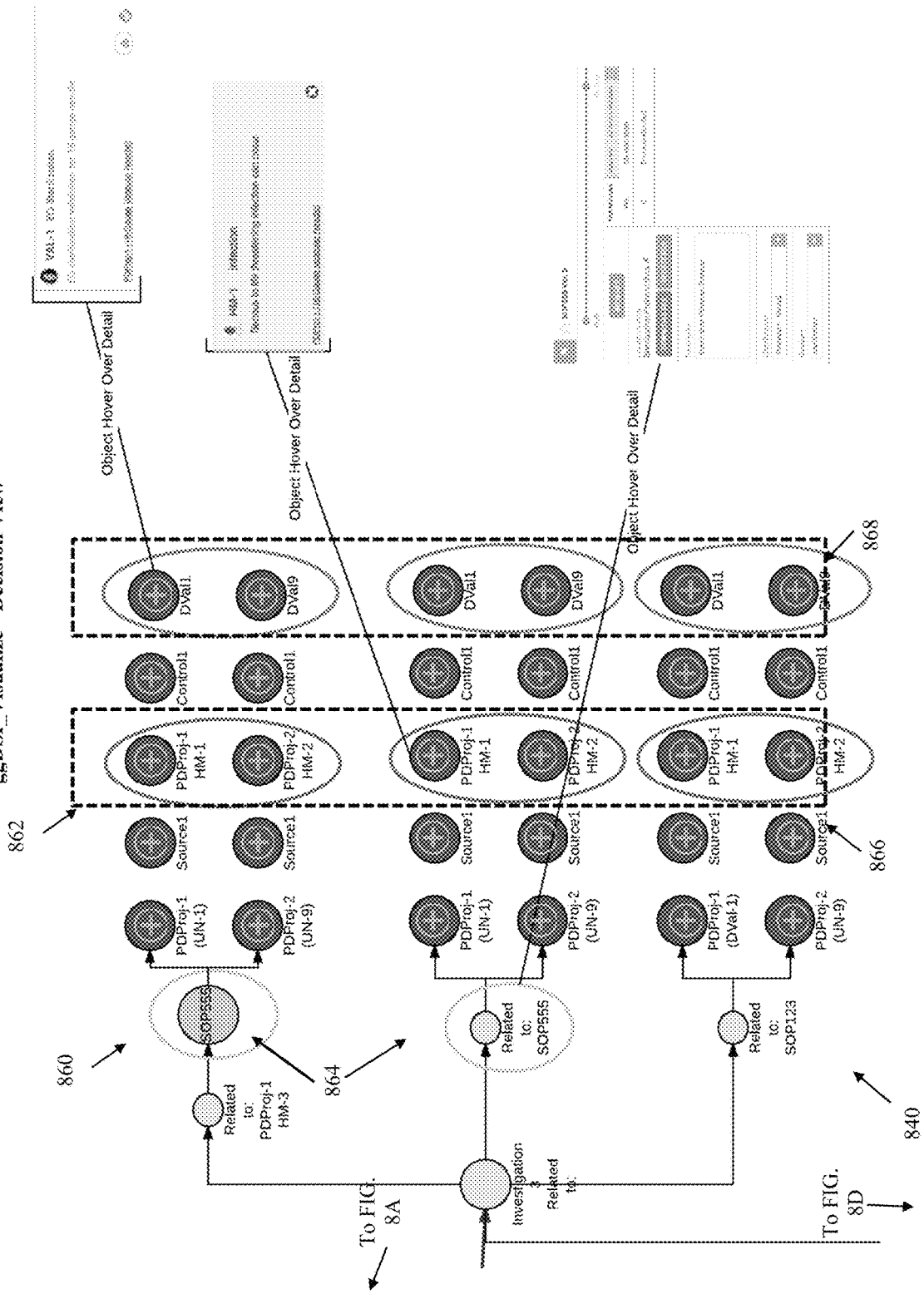
FIG. 8C displays a combination flowchart of a method and components managing compliance of regulated products according to at least one embodiment of the present disclosure.

In at least one embodiment of the present disclosure, the ggDSI platform 104d is configured to present a plurality of visual compilations of the results. Continuing with the above example, the ggDSI platform is configured to present a global view 800 (as shown in FIG. 8); an Expanded View of a ggObject 810 (as shown in FIG. 8A), a ggObject view 820 (as shown in FIG. 8B); a decision view 840 (as shown in FIG. 8C); and an task ggObject view 880 (as shown in FIG. 8C). It will be appreciated that the plurality of visual compilations create a visual presentation of the data leveraging inherent customer defined relationships, whether at the highest application level or lowest ggObject. It will be further appreciated that because the relationships between the objects are reciprocal/bidirectional, navigation in any direction through the relationships is possible.

In at least one embodiment of the present disclosure, the global view 800 (as shown in a most macro view), allows specific users (defined by role) to see every workspace and ggObjects in the application and their inherent relationships to each other. In at least one embodiment of the present disclosure, the global view 800 is configured to allow the holistic viewing of ggObjects and their relationships within a specific workspace. For example, a document management workspace allows viewing of all documents and their relationships to other ggObjects.

In at least one embodiment of the present disclosure, ggObject view 820 shows all object relationships pertinent to a specific Corrective Action and Preventative Action (i.e. CAPA1234). It will be appreciated that when ggObject view 820 is requested for a specific object (e.g. CAPA1234), the ggObject view 820 is configured to that object. It will be further appreciated that from the specific object (e.g. CAPA1234), other ggObjects related to the specific object may be visualized, thereby creating a relationship chain, until the very last ggObject in the relationship chain.

In at least one embodiment of the present disclosure, the decision view 840 displays a user interface (UI) containing the results of the ggDSI platform 104d's indexes and algorithms to assist a user's decision making process.

In at least one embodiment of the present disclosure, the task ggObject view 880 displays the results for each of the related to objects 882 as shown. It will be appreciated that the task ggObject view 880 offers users a compact view, whereby users do not have to rely on the full visual model views as shown in FIGS. 8, 8A, and 8B. It will be further appreciated that the task ggObject view 880 allows the user to easily and tangibly understand the key relationships and points of intersection without having to review all the information presented via the visual models (as shown in FIGS. 8, 8A and 8B). Where the visual models (as shown in FIGS. 8, 8A and 8B) allow a user a holistic view of the relationships, the task ggObject view 880 allows the user to focus only on the most relevant of objects as determined by the ggDSI algorithms through the CRI score. By way of an example, FIG. 8D shows the starting point as Investigation 3, and the corresponding expanded view displays all the relationships and data objects relevant to investigation 3 (i.e. related to PDPProj-1 HM-3, SOP555, and SOP123). Correspondingly, a user looking only for pertinent information focused only on the most relevant objects, can operate ggDSI_Visualize Decision View to view the related objects 882, as shown in FIG. 8D.

In at least one embodiment of the present disclosure, a user has the ability to see each related item independently. By way of example, objects 882 are related to PDProj-1, SOP555 and SOP123 (as shown in FIG. 8D). The ggDSI platform 104d uses the patterns and relationships for all of the related to objects to determine correlation confidence in the returned results. Thus if all three objects have the same intersection and related objects, the correlation confidence goes up. It will be appreciated that this is important for users to efficiently and effectively determine where to focus their efforts and assessment of risk. Continuing with the above example, SOP555 is seen in two of the related to objects (as shown at 864, in FIG. 8C). Thus, SOP555 is given a CRI Score mathematically determined to be "Medium". However, PDProj-1 HM-1 and PDProj-2 HM-2 are seen in all of the relationships (as shown at 866 in FIG. 8C), thereby having a CRI Score mathematically determined to be "High." Similarly, Design Validation (DVal1) and DVal9 are also seen in all of the relationships (as shown at 868 in FIG. 8C), thereby also having a high ggObject CRI Score. In FIG. 8C, user can add objects to FIG. 8D by clicking on the plus arrow for the ggObject. This creates a new direct relationships to the ggObject. This is important as the ggDSI_Visualize provides key information that assists the decision making process and allows the user to create new relationships and more importantly, create relationships to the ggTask system which generates the work tasks for users to implement the intelligence from ggDSI platform.

In at least one embodiment of the present disclosure, the ggDSI platform 104d is configured to recognize discrepancies in a customer's project as the entire data set of all customers shows statistically that 95% of the products with the same classification, intended use, indications for us, product code have performed both biocompatibility and sterilization validations whereas the current customer has not. This creates a risk alert which provides the user with information to identify, evaluate and correct, if deemed necessary. It will be appreciated that ggDSI provides intel into how well a company's risk mitigations work within design and development process thereby provides overall scoring and feedback by project and as a company whole. In at least one embodiment of the present disclosure, the ggDSI platform 104d looks at each one of the project's (design controls and risk sources—controls/mitigations) and measures this against quality events have occurred through other workspaces such as complaints, CAPAs and audits. The frequency and severity/impact of the findings in other workspaces has a direct correlation to the effectiveness of a project's design and risk management systems. It will be further appreciated that the ggDSI platform 104d compares a company's initial risk and associated controls/mitigations defining its residual to determine how the company's risk acceptability compares to other similar projects for the company and across all other companies, as further disclosed herein.

In at least one embodiment of the present disclosure, the ggDSI platform 104d leverages a risk-based methodology to focus auditing efforts on areas where there are potential issues. It will be appreciated that ggDSI provides a predictive model. For example, all medical device companies have an audit plan which requires the company to fully audit all of its QMS processes and procedures at certain intervals and presumed risk. Continuing with this example, the ggDSI platform 104d would provide the company with the ability to analyze areas of potential risk based upon identified risk patterns across the company's data as well as risk patterns that are showing up across all customers within the ggDSI platform 104d in at least one embodiment of the present disclosure, the ggDSI platform 104d is further configured to use external source 110, such as, for example, FDA warning letters or 483 observations to determine potential deficiencies within the company's data. It will be appreciated that once a potential deficiency has been identified by the ggDSI platform 104d, areas for auditing are recommended to the company. For example, if the FDA is stating a higher frequency of observations in relationship to packaging validation and its requirements to specific regulations, the ggDSI platform 104d will audit the customers packaging validations contained within the application and suggest areas of auditing for the customer to determine compliance.

In at least one embodiment of the present disclosure, the ggDSI platform 104d is further configured to aggregate and perform analysis based on data from a plurality of customers. For example, company A may be a customer using the ggDSI platform 104d, as is company B through Company Z. The each of the plurality of companies may have data related to investigations, root cause, and the like. It will be appreciated that by performing analysis on this large set of data, and allowing a company to be compared against the larger data set from the other companies, this provides for stronger insight into quality events and outcomes.

In at least one embodiment of the present disclosure, the ggDSI platform 104d is configured to provide comparative indexes that help a company identify how it measures up to other companies relative to key performance indexes. For example, regulated product companies use similar key performance indicators (KPIs) to define the health of their quality system. The ggDSI platform 104d is configured to index the necessary data to help a company understand how they measure up against other customer companies. For example, company A can set their own benchmarks for setting internal KPI goals, while ggDSI is also configured to allow such companies to see how their goals and performance is compared across similar regulated product companies. The ggDSI platform 104d is then configured to establish rankings that let the customer know how they compare overall. For example, company A, may be in the top 1%, top 5%, top 10%, top 25%, bottom 1%, bottom 5%, bottom 10%, or bottom 25%, to name a few, non-limiting examples. In at least one embodiment of the present disclosure, KPIs are selected from a group consisting of average number of change orders opened over a period of time; average days to close for CAPAs, Complaints, Audits, Nonconformances; effectiveness of corrective actions; impact of investigation finding; root cause identification; audit findings; on time actions; training effectiveness, retraining requirements; change request trending; process change trending; complaints by month; complaints by reason; % solution identified and corrected; Risk Acceptability Matrix; and product risk profiles and attributed residual risks.

It will be appreciated that KPI trends are used to inform users at different levels of the organization. For example, a CEO/COO/VP can see their companies KPIs, their goals, how they rank among other companies and what are their Top Gainers (improving) or Top Losers (getting worse, adding risk); workspace managers can see their companies KPIs as related to their workspace, their goals, how they rank among other companies and what are their Top Gainers (improving) or Top Losers (getting worse, adding risk); object owners can see their companies KPIs as related to their object they own within a workspace, its goal, how they rank among other companies and is their object a Top Gainers (it's improving) or a Top Losers (getting worse, adding risk).

In at least one embodiment of the present disclosure, the ggDSI platform 104d includes a global index which uses and retains a global definition of this index and cannot be modified by the individual customer; and, a customer preferences index which learns what a customer may or may not deem applicable. The customer preference allows the index at the customer level to learn from their input. For example, if the ggDSI platform 104d returns results to a customer that the customer does not agree with, the ggDSI platform 104d is configured to 'retain' such feedback in the customer index. It will be appreciated that the results may allow the customer to strongly agree, agree, disagree or strongly disagree.

In at least one embodiment of the present disclosure, the global index is used to identify consistent pattern across all of the customers. The global index thereby 'learns' patterns from the customer input. It will be appreciated that the ggDSI platform 104d allows a customer to opt-in or opt-out. If the customer opts-in ggDSI would be available to them. If the customer opts-out, the customer opts out of the functionality of ggDSI as well as remove their data from being used in any ggDSI indexes or algorithms.

In at least one embodiment of the present disclosure, the method 700 further includes the step of providing outputs within the client/user 102, at step 716. It will be appreciated that each outcome determination, or report is displayed to the user via client/user 102. It will be further appreciated that the user may additionally operate the client/user 102 so as to modify and interact the outputs therein.

It will be appreciated that although the foregoing deals with exemplary embodiments of medical products, the processes and systems disclosed herein may be applied to any regulated product or matter requiring regulatory authority oversight. This includes, but is not limited to, drug manufacturing, food manufacturing, biologics manufacturing, electronic products, cosmetics, tobacco products, and the like, to name a few, non-limiting examples.

Having thus described an embodiment, it should be apparent to those skilled in the art that certain advantages of the described method and system have been achieved. It should also be appreciated that various modifications, adaptations, and alternative embodiments thereof

What is claimed is:

1. A computerized method for performing risk assessment and management of a medical device, the method comprising:
   a computer infrastructure communicably coupled to a plurality of data sources selected from a group consisting of a manufacturing process for the medical device, an equipment calibration process, a product-design and development process for the medical device, a customer feedback process, a hazards repository, a medical device's relationships, federal agency regulatory findings, and third-party databases;
   creating, at the computer infrastructure, one or more product attributes of the medical device, each of the one or more product attributes selected from a group consisting of a classification, an intended use, an indications for use, product code, a risk profile;

creating, at the computer infrastructure, a plurality of design control objects for the one or more risk profiles, and the one or more product attributes, the each of the plurality of design control objects is selected from a group consisting of user need, design input, design output, design verification, design validation, design review, and a design history file;

creating, at the computer infrastructure, a plurality of risk management objects, for, the one or more risk profiles, and the one or more product attributes, the each of the plurality of risk management objects is selected from a group consisting of a hazard, a foreseeable event, a hazardous situation, a harm, and a risk management file;

creating, at the computer infrastructure, a plurality of platform relationships between the each of the plurality of design control objects, and the each of the risk management objects, the plurality of platform relationships being bidirectional and reciprocal;

creating, at the computer infrastructure, a plurality of customer configured relationships, the plurality of customer configured relationships being bidirectional and reciprocal;

correlating, at the computer infrastructure, the combination of the each of the plurality of platform relationships, and the each of the plurality of customer configured relationships;

evaluating, at the computer infrastructure, a plurality of risk management actions for the medical device, and based at least in part on a risk weight for the each of the design control objects and risk management objects;

compiling, at the computer infrastructure, an output summary format of a quality assurance of the medical device, the output summary format comprising a plurality of visual compilations of the each of the design control objects, the risk management objects, and a risk assessment based on the risk weight for the each of the plurality of platform relationships;

automatically indicating to a user, via the computer infrastructure, the risk assessment and the each of the plurality of visual compilations when the each of the design control objects and risk management objects are added, changed, or modified;

compiling, at the computer infrastructure, a graphical output to read, interpret and understand data from different data sources and their relationships to the product development processes including design controls and risk management controls ensuring building of a safe and effective medical device;

controlling, at the computer infrastructure, a change process wherein each of the design control objects, the risk management objects, and a risk assessment based on the risk weight can be changed and creating a workflow associated with assigning permissions, understanding, reviewing and approving changes via electronic signatures; and compiling and controlling, at the computer infrastructure, an immutable audit log of all changes that are made to the plurality of data sources.

2. The method of claim 1, wherein the platform relationships further comprises an object selected from a group consisting of design reviews, documents, corrective action preventative action, audits, product and process controls, and nonconformances.

3. The method of claim 2, wherein correlating the combination of the each of the plurality of platform relationships, and the each of the plurality of customer configured relationships, further comprises following the combination linked data to a plurality of secondary objects, fetching the plurality of secondary objects, and the customer configured relationships of the plurality of secondary objects.

4. The method of claim 2, wherein correlating further comprises measuring a degree of relatedness between a first object, and a second object.

5. The method of claim 1, wherein determining the risk weight for the each of the plurality of platform relationships further comprises determining using a first object, and the first object's use by a second object, and further determining the strength of a correlation between the first object and the second object.

6. The method of claim 1, wherein determining the risk weight for the each of the plurality of platform relationships further comprises determining a first risk weight attributable to a first object, and a second risk weight attributable to a second object.

7. The method of claim 6, wherein determining the risk weight further comprises linking the first risk weight and the second risk weight, wherein the higher the first risk weight and the second risk weight, the higher the importance.

8. The method of claim 1, wherein the one or more products attributes are received from a plurality of customers.

9. The method of claim 1 further comprising the step of determining, at the computer infrastructure, a root cause quality problem, a potential problem, a predictable situation, a preventative measure, and providing the root cause quality problem, the potential problem, and the preventative measure via a graphical user interface.

10. The method of claim 1 wherein the visual compilations is selected from a group consisting of a global view, an object view, a decision view, and a task object view.

11. The method of claim 10 wherein the object view comprises a specific object, and the plurality of platform relationships associated with the specific object.

12. The method of claim 10 wherein the task object view comprises a specific relevant object, the specific relevant object determined based on a correlation, relevance and importance score.

13. The method of claim 1, wherein the networked data source further comprises an equipment manufacturing process.

14. The method of claim 1, further comprising receiving, at the computer infrastructure, one or complaints about the medical device, from the networked data source.

15. The method of claim 14, further comprising receiving, at the computer infrastructure, one or more hazard management objects associated with the medical device, from the networked data source.

16. The method of claim 15, further comprising evaluating, at the computer infrastructure, the plurality of risk management actions for the medical device, the plurality of risk management actions designed to mitigate the one or more complaints or the one or more hazards, and based at least in part on the risk weight for the each of the design control objects and risk management objects;

determining, at the computer infrastructure, a calibration setting of the equipment calibration process, a maintenance schedule for the medical device, a calibration frequency for the medical device, and a calibration change detection for the medical device;

creating, a manufacturing process change of the manufacturing process based on the calibration setting of the manufacture of the equipment calibration process; and displaying, via a plurality of visual compilations, a risk assessment based on the risk weight for the each of the plurality of platform relationships, and the maintenance schedule for the medical device, the calibration frequency for the medical device, and the calibration change detection for the medical device.

17. A system for performing risk assessment and management of a medical device, the system comprising:

a computer infrastructure configured to receive one or more complaints about the medical device, one or more hazards associated with the medical device, one or more product attributes of the medical device, the each of the one or more product attributes selected from a group consisting of a classification, an intended use, an indications for use, product code, a risk profile, a verification activity, and a validation activity;

an analysis database configured for inserting, each of the one or more product attributes of the medical device;

the system configured to create a plurality of design control objects for the one or more complaints, the one or more hazards, and the one or more product attributes, the each of the plurality of design control objects is selected from a group consisting of user need, design input, design output, design verification, design validation, design review, and a design history file;

the system configured to create a plurality of risk management objects for the one or more complaints, the one or more hazards, and the one or more product attributes, the each of the plurality of risk management objects is selected from a group consisting of a hazard, a foreseeable event, a hazardous situation, a harm, and a risk management file;

the system configured to create a plurality of platform between the each of the plurality of design control objects, and the each of the risk management objects, the plurality of relationships being bidirectional and reciprocal;

the system configured to evaluate a plurality of risk management actions for the medical device, the plurality of risk management actions designed to mitigate the one or more complaints or the one or more hazards, and based at least in part on the risk weight for the each of the design control objects and risk management objects;

the system configured to compile an output summary format of a quality assurance of the medical device, the output summary format comprising a plurality of visual compilations of the each of the design control objects, the risk management objects, and a risk assessment based on the risk weight for the each of the plurality of platform relationships;

the system further configured to compile a graphical output to read, interpret and understand data from different data sources and their relationships to the product development processes including design controls and risk management controls ensuring building of a safe and effective medical device; and the system further configured to compile and control an immutable audit log of all changes that are made to the plurality of data sources.

18. The system of claim 17, wherein:

the system is further configured to create a plurality of customer configured relationships, the plurality of customer configured relationships being bidirectional and reciprocal;

the system is further configured to correlate the combination of the each of the plurality of platform relationships, and the each of the plurality of customer configured relationships;

the system is further configured to determine a relevance and importance of the combination of the each of the plurality of platform relationships, and the each of the plurality of customer configured relationships; and the system is further configured to determine a root cause quality problem, a potential problem, a predictable situation and a preventative measure.

19. The system of claim 17, wherein the plurality of relationships comprise platform relationships and customer configured relationships.

20. The system of claim 17, wherein the computer infrastructure is configured to receive each of the one or more product attributes from a plurality of sources, the plurality of sources selected from a group consisting of a customer's determined relationships, federal agency regulatory findings, and third-party databases.

21. The system of claim 17, wherein the computer infrastructure is configured to receive the one or more products attributes from a plurality of customers.

22. The system of claim 17, wherein the computer infrastructure is further configured to provide the root cause quality problem, the potential problem, and the preventative measure via a graphical user interface.

23. The system of claim 17, wherein the computer infrastructure is configured to present the combination of the each of the plurality of platform relationships, and the each of the plurality of customer configured relationships, via a plurality of visual complications selected from a group consisting of a global view, an object view, a decision view, and a task object view.

* * * * *